United States Patent
Joshy

(10) Patent No.: US 11,487,899 B2
(45) Date of Patent: Nov. 1, 2022

(54) AUTOMATED TIERED SECURITY FOR CONFIDENTIAL INFORMATION AND CONFIDENTIAL INFORMATION SHARING AND METHODS THEREOF

(71) Applicant: Capital One Services, LLC, McLean, VA (US)

(72) Inventor: Rendheer Joshy, Glen Allen, VA (US)

(73) Assignee: Capital One Services, LLC, McLean, VA (US)

( * ) Notice: Subject to any disclaimer, the term of this patent is extended or adjusted under 35 U.S.C. 154(b) by 91 days.

(21) Appl. No.: 17/081,719

(22) Filed: Oct. 27, 2020

(65) Prior Publication Data

US 2022/0129577 A1   Apr. 28, 2022

(51) Int. Cl.
*G06F 21/62* (2013.01)
*G06F 40/205* (2020.01)
*G06F 21/31* (2013.01)
*G06F 21/64* (2013.01)

(52) U.S. Cl.
CPC .......... *G06F 21/6245* (2013.01); *G06F 21/31* (2013.01); *G06F 21/645* (2013.01); *G06F 40/205* (2020.01)

(58) Field of Classification Search
CPC ...... G06F 40/174; G06F 21/445; G06F 21/31; G06F 21/645; G06F 21/6245
See application file for complete search history.

(56) References Cited

U.S. PATENT DOCUMENTS

| | | | |
|---|---|---|---|
| 2014/0196129 A1* | 7/2014 | Amin | H04L 63/08 726/6 |
| 2017/0147550 A1* | 5/2017 | Wetzel | H04W 4/20 |
| 2019/0122215 A1* | 4/2019 | Trivedi | G06Q 20/204 |
| 2020/0211031 A1* | 7/2020 | Patil | G07F 17/26 |
| 2022/0121809 A1* | 4/2022 | Bakman | H04L 67/1097 |

* cited by examiner

*Primary Examiner* — Dao Q Ho
(74) *Attorney, Agent, or Firm* — Greenberg Traurig, LLP

(57) ABSTRACT

Systems and methods of the present disclosure enable automated sharing of confidential information according to tiers of security by receiving an electronic information request from an automated form production application of a computing device associated with a third-party entity. A request security tier associated with the electronic information request is determined according to a security tier of the user-related secure data. At least one authentication requirement associated with the request is determined according to authentication settings of the security tier. An authentication request is generated enabling the user to provide an authentication response to approve the computing device for access to the user-related secure data. The user authentication response is received, the user is authenticated based on the user authentication response and the computing device is allowed to access the user-related secure data to auto-populate each field of an electronic form with associated items of the user-related secure data.

12 Claims, 9 Drawing Sheets

AUTOMATED TIERED SECURITY FOR CONFIDENTIAL INFORMATION AND CONFIDENTIAL INFORMATION SHARING AND METHODS THEREOF

FIELD OF TECHNOLOGY

The present disclosure generally relates to computer-based systems configured for enforcing security and authentication requirements for data in one or more security tiers, including the automated application of tiered security for confidential information and automated sharing of confidential information based on authentication according to the tiered security.

BACKGROUND OF TECHNOLOGY

Electronic sharing of information can often be a cumbersome task, such as in situations of confidential information sharing for forms, accounts, applications, and other scenarios where confidential information may be needed. Typically, sharing this information often requires a user to enter each item of information. Moreover, the security of such information is compromised due to inadequate security measures or an inability for the recipient to interface with the information source in a secure manner with inadequate or inappropriate security requirements for each item of information.

SUMMARY OF DESCRIBED SUBJECT MATTER

In some embodiments, the present disclosure provides an exemplary technically improved computer-based method that includes at least the following steps of receiving, by at least one processor, an electronic information request from an automated form production application of a computing device associated with a third-party entity; where the electronic information request includes user-related secure data associated with at least one form; where the user-related secure data is associated with an account of a user; determining, by the at least one processor, a request security tier associated with the electronic information request according to an assigned security tier of each item of the user-related secure data; determining, by the at least one processor, at least one authentication requirement associated with the request security tier according to authentication settings of the assigned security tier of each item of the user-related secure data; where the at least one authentication requirement includes a set of user authentication methods based on the request security tier; generating, by the at least one processor, an authentication request enabling the user to provide user authentication response to the at least one authentication requirement to approve the computing device associated with the third-party entity for access to the user-related secure data; receiving, by the at least one processor, the user authentication response from the user in response to the at least one authentication requirement; authenticating, by the at least one processor, the user based on the user authentication response; and allowing, by the at least one processor, the computing device associated with the third-party entity to access the user-related secure data associated the electronic information request in response to the authentication of the user; and where the automated form production application auto-populates each field of the electronic form with associated items of the user-related secure data.

In some embodiments, the present disclosure provides an exemplary technically improved computer-based system that includes at least the following components of at least one processor configured to implement instructions stored in a non-transitory computer readable medium. The instructions cause the at least one processor to perform steps to: receive an electronic information request from an automated form production application of a computing device associated with a third-party entity; where the electronic information request includes user-related secure data associated with at least one form; where the user-related secure data is associated with an account of a user; determine a request security tier associated with the electronic information request according to an assigned security tier of each item of the user-related secure data; determine at least one authentication requirement associated with the request security tier according to authentication settings of the assigned security tier of each item of the user-related secure data; where the at least one authentication requirement includes a set of user authentication methods based on the request security tier; generate an authentication request enabling the user to provide user authentication response to the at least one authentication requirement to approve the computing device associated with the third-party entity for access to the user-related secure data; receive the user authentication response from the user in response to the at least one authentication requirement; authenticate the user based on the user authentication response; and allow the computing device associated with the third-party entity to access the user-related secure data associated the electronic information request in response to the authentication of the user; and where the automated form production application auto-populates each field of the electronic form with associated items of the user-related secure data.

The systems and methods of the present disclosure further include: identifying, by the at least one processor, each security classification associated with the user-related secure data of each item of the user-related secure data; determining, by the at least one processor, each security tier of each security classification; and determining, by the at least one processor, the request security tier as a most secure security tier based on a hierarchy of security tiers.

The systems and methods of the present disclosure further include where the hierarchy of security tiers includes more secure authentication requirements for a greater level of security tier in the hierarchy of security tiers.

The systems and methods of the present disclosure further include determining, by the at least one processor, the assigned security tier of each item of the user-related secure data based on an information type of each item of the user-related secure data.

The systems and methods of the present disclosure further include where the user-related secure data associated each item of the user-related secure data includes at least one JSON file stored in a user account.

The systems and methods of the present disclosure further include where the automated form production application is configured to parse the user-related secure data according to fields of the at least one form to auto-populate the fields with the user-related secure data.

The systems and methods of the present disclosure further include where assigned security tier of each item of the user-related secure data are user-defined.

The systems and methods of the present disclosure further include where assigned security tier of each item of the user-related secure data are predetermined based on types of information.

The systems and methods of the present disclosure further include: determining, by the at least one processor, a type of information of each item of the requested information; and determining, by the at least one processor, the assigned security tier of each item of the requested information based at least in part on the type of information of each item of the requested information.

The systems and methods of the present disclosure further include restricting, by the at least one processor, access to the user-related secure data associated with each item of the user-related secure data by the automated form production application until a user verification input verifying the user-related secure data associated with each item of the user-related secure data.

BRIEF DESCRIPTION OF THE DRAWINGS

Various embodiments of the present disclosure can be further explained with reference to the attached drawings, wherein like structures are referred to by like numerals throughout the several views. The drawings shown are not necessarily to scale, with emphasis instead generally being placed upon illustrating the principles of the present disclosure. Therefore, specific structural and functional details disclosed herein are not to be interpreted as limiting, but merely as a representative basis for teaching one skilled in the art to variously employ one or more illustrative embodiments.

DETAILED DESCRIPTION

Various detailed embodiments of the present disclosure, taken in conjunction with the accompanying figures, are disclosed herein; however, it is to be understood that the disclosed embodiments are merely illustrative. In addition, each of the examples given in connection with the various embodiments of the present disclosure is intended to be illustrative, and not restrictive.

Throughout the specification, the following terms take the meanings explicitly associated herein, unless the context clearly dictates otherwise. The phrases "in one embodiment" and "in some embodiments" as used herein do not necessarily refer to the same embodiment(s), though it may. Furthermore, the phrases "in another embodiment" and "in some other embodiments" as used herein do not necessarily refer to a different embodiment, although it may. Thus, as described below, various embodiments may be readily combined, without departing from the scope or spirit of the present disclosure.

In addition, the term "based on" is not exclusive and allows for being based on additional factors not described, unless the context clearly dictates otherwise. In addition, throughout the specification, the meaning of "a," "an," and "the" include plural references. The meaning of "in" includes "in" and "on."

As used herein, the terms "and" and "or" may be used interchangeably to refer to a set of items in both the conjunctive and disjunctive in order to encompass the full description of combinations and alternatives of the items. By way of example, a set of items may be listed with the disjunctive "or", or with the conjunction "and." In either case, the set is to be interpreted as meaning each of the items singularly as alternatives, as well as any combination of the listed items.

FIGS. 1 through 9 illustrate systems and methods of confidential information security via a tiered security system, and automated sharing of confidential information according tiered security and authentication requirements. The following embodiments provide technical solutions and technical improvements that overcome technical problems, drawbacks and/or deficiencies in the technical fields involving data security and authentication of access to confidential information. As explained in more detail, below, technical solutions and technical improvements herein include aspects of improved enforcement of authentication requirements for improved security of confidential information across tiers of security for manual and automated access, including automated sharing of confidential information upon the satisfaction of the tiered security and authentication requirements. Based on such technical features, further technical benefits become available to users and operators of these systems and methods. Moreover, various practical applications of the disclosed technology are also described, which provide further practical benefits to users and operators that are also new and useful improvements in the art.

Figure 1:
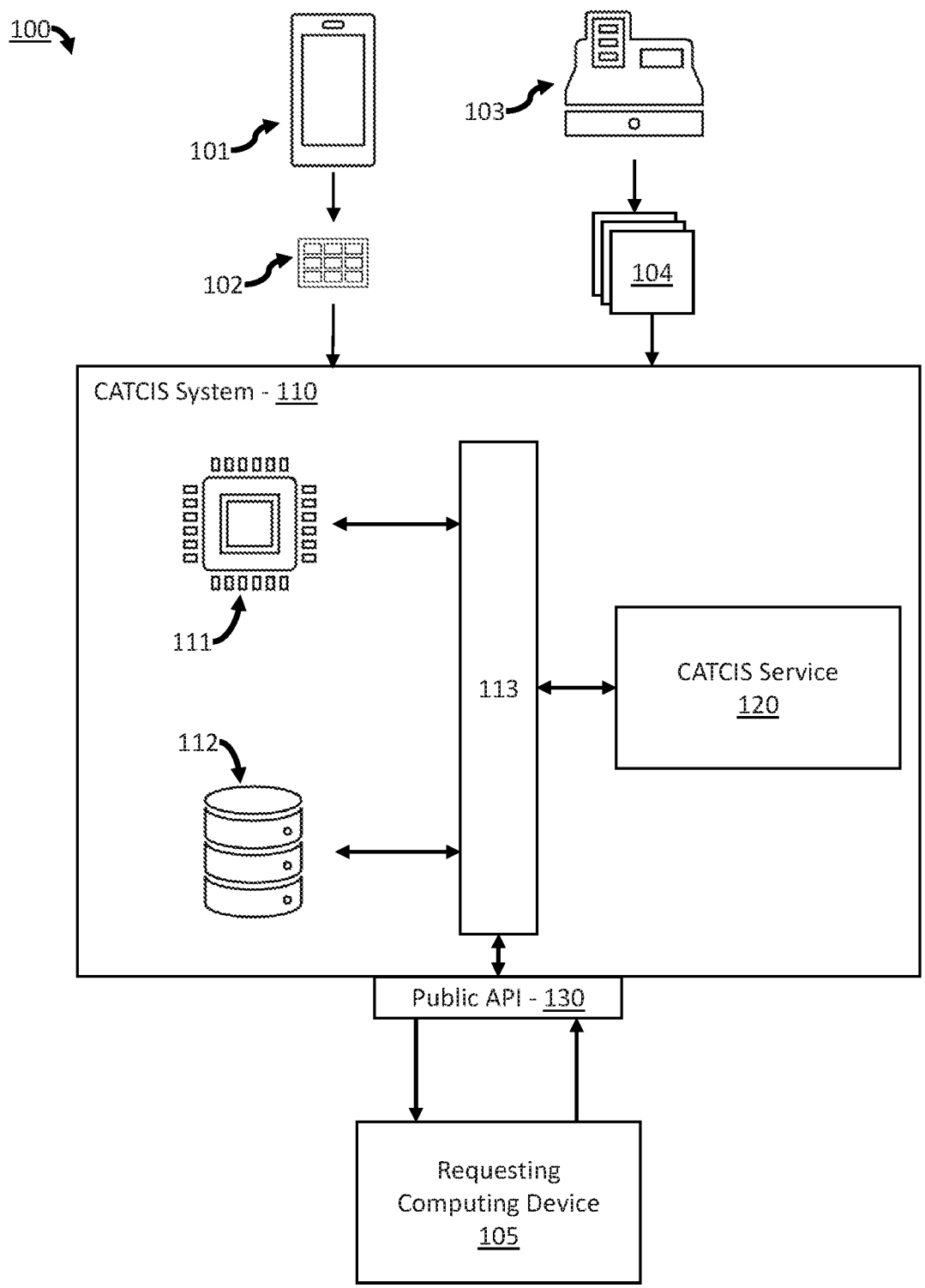
FIGS. 1-9 show one or more schematic flow diagrams, certain computer-based architectures, and/or screenshots of various specialized graphical user interfaces which are illustrative of some exemplary aspects of at least some embodiments of the present disclosure.

FIG. 1 is a block diagram of an exemplary computer-based system for controlled automated tiered confidential information sharing in accordance with one or more embodiments of the present disclosure.

In some embodiments, a data sharing ecosystem 100 may be formed that leverages various levels of authentication and permissioning for different types of data. User's may entrust confidential information to a controlled automated tiered confidential information sharing (CATCIS) system 110 that can automatically share the confidential information with participating software applications and devices subject to tiered security requirements of each item of user-related data holding the confidential information. In so doing, the CATCIS system 110 may facilitate the user sharing of the confidential information using permissioning and authentication responsive to the sensitivity of each item of the confidential information.

In some embodiments, the confidential information may be embodied in user provided data 102 communicated or otherwise received from a user computing device 101. In some embodiments, a user operating the user computing device 101 may access an account or profile managed by the CATCIS system 110, e.g., via an application programming interface (API) through a software application on the user computing device 101, direct connection, web browser interface, or other form of communicating the user provided data to the CATCIS system 110.

In some embodiments, the confidential information may be embodied in electronic activity data 104 from electronic activity systems 103. For example, the electronic activity systems 103 may include transaction authorization devices, e.g., point-of-sale devices, online payment providers, among other transaction authorization devices, that produce transaction data as the electronic activity data 104. However, other electronic activity systems 103 may be employed, such as, e.g., HIPPA compliant health information systems, lender systems, social media networks, mobility services (e.g., Google Mobile Services, Microsoft Mobile Services, etc.), software development kits (SDKs), among other systems that may access user-related data in electronic activities.

In some embodiments, the CATCIS system 110 may receive the user provided data 102, the electronic activity data 104, or both, for automated authentication requirement enforcement according to one or more security tiers specifying authentication requirements. In some embodiments, the CATCIS system 110 may be a part of the user computing device 101, the electronic activity stems 103, a cloud-driven service, or a hybrid implementation thereof. Thus, the CATCIS system 110 may include hardware and software components including, e.g., user computing device 101 hardware and software, electronic activity systems 103 hardware and software, cloud or server hardware and software, or a combination thereof.

In some embodiments, the CATCIS system 110 may include hardware components such as a processor 111, which may include local or remote processing components. In some embodiments, the processor 111 may include any type of data processing capacity, such as a hardware logic circuit, for example an application specific integrated circuit (ASIC) and a programmable logic, or such as a computing device, for example, a microcomputer or microcontroller that include a programmable microprocessor. In some embodiments, the processor 111 may include data-processing capacity provided by the microprocessor. In some embodiments, the microprocessor may include memory, processing, interface resources, controllers, and counters. In some embodiments, the microprocessor may also include one or more programs stored in memory.

Similarly, the CATCIS system 110 may include storage 112, such as local hard-drive, solid-state drive, flash drive, database or other local storage, or remote storage such as a server, mainframe, database or cloud provided storage solution.

In some embodiments, the CATCIS system 110 may implement computer engines for enforcing tiered security restrictions for user-related secure data and for providing automatic access to the user-related secure data by, e.g., requesting computing devices 105 and software applications thereof. In some embodiments, the terms "computer engine" and "engine" identify at least one software component and/or a combination of at least one software component and at least one hardware component which are designed/programmed/configured to manage/control other software and/or hardware components (such as the libraries, software development kits (SDKs), objects, etc.).

Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. In some embodiments, the one or more processors may be implemented as a Complex Instruction Set Computer (CISC) or Reduced Instruction Set Computer (RISC) processors; x86 instruction set compatible processors, multi-core, or any other microprocessor or central processing unit (CPU). In various implementations, the one or more processors may be dual-core processor(s), dual-core mobile processor(s), and so forth.

Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

In some embodiments, to determine the errors, the CATCIS system 110 may include computer engines including, e.g., a CATCIS service 120. In some embodiments, the CATCIS service 120 may enforce tiered security restrictions for user-related secure data and for provide automatic access to the user-related secure data by, e.g., requesting computing devices 105 and software applications thereof. In order to implement the CATCIS service 120, the CATCIS service 120 may be implemented as one or more computer engines that may include software components, hardware components, or a combination thereof. For example, each computer engine may include a dedicated processor and storage. However, in some embodiments, the computer engines share hardware resources, including the processor 111 and storage 112 of the CATCIS system 110 via, e.g., a bus 113. Thus, the CATCIS service 120 may include a memory including software and software instructions, such as, e.g. machine learning models and/or logic for implementing the security tiers for controlled automated tiered confidential information sharing.

In some embodiments, the CATCIS service 120 may receive the user-related data, including the user provided data 102, the electronic activity data 104, or both, to categorize each item of the user-related data according security tiers. In some embodiments, the security tiers may be predefined in the CATCIS system 110 to include multiple security tiers having increasingly stringent authentication requirements to better secure more sensitive data. In some embodiments, the security tiers may include predetermined types of information to be assigned to each security tier according to the sensitivity of the information. However, in some embodiments, the security tiers may be user configurable from the user computing device 101. For example, the user may access an account or profile and select a number of security tiers and the types of information to be assigned to each security tier.

In some embodiments, a user may sign up to the CATCIS service 120 to collect user-related data for use in controlled automated tiered confidential information sharing. Accordingly, the user may opt in to data collection or collection of certain data from specified sources, including user provided data 102 and selected or available electronic activity data 104. For example, the user may opt in for the CATCIS system 110 and CATCIS service 120 to access, retrieve, or otherwise receive information from, e.g., credit checks, loan documents, financial account data, medical data, online activity data, social media data among other data. The CATCIS service 120 may then extract each data item from the user provided data 102, electronic activity data 104, or both, and populate a user profile for the user with each data item assigned to a matching security tier.

In some embodiments, the CATCIS service 120 may determine a type of information represented by each data item. For example, the user provided data 102 may be provided with data attributes specifying the type of information (e.g., name, address, city, state, contact information, age, data of birth, financial assets information, etc.). Similarly, for electronic activity systems 103 configured to participate in the controlled automated tiered confidential information sharing with the CATCIS system 110, the electronic activity data 104 may include data attributes specifying a type of information for each data item.

In some embodiments, the CATCIS service 120 may also or alternatively include automated identification of information. In some embodiments, the automated identification may include logic-based algorithms, where the type of electronic activity is identified, and the data items of the electronic activity data 104 is parsed using a set of templates matching the electronic activity.

In some embodiments, the CATCIS service 120 may employ machine learning based parsing of the electronic activity data 104, such as, e.g., semantic segmentation, natural language processing, or machine learning classification. In some embodiments, the CATCIS service 120 may be configured to utilize one or more exemplary AI/machine learning techniques chosen from, but not limited to, decision trees, boosting, support-vector machines, neural networks, nearest neighbor algorithms, Naive Bayes, bagging, random forests, and the like. In some embodiments and, optionally, in combination of any embodiment described above or below, an exemplary neutral network technique may be one of, without limitation, feedforward neural network, radial basis function network, recurrent neural network, convolutional network (e.g., U-net) or other suitable network. In some embodiments and, optionally, in combination of any embodiment described above or below, an exemplary implementation of Neural Network may be executed as follows:
  i) Define Neural Network architecture/model,
  ii) Transfer the input data to the exemplary neural network model,
  iii) Train the exemplary model incrementally,
  iv) determine the accuracy for a specific number of timesteps,
  v) apply the exemplary trained model to process the newly-received input data,
  vi) optionally and in parallel, continue to train the exemplary trained model with a predetermined periodicity.

In some embodiments and, optionally, in combination of any embodiment described above or below, the exemplary trained neural network model may specify a neural network by at least a neural network topology, a series of activation functions, and connection weights. For example, the topology of a neural network may include a configuration of nodes of the neural network and connections between such nodes. In some embodiments and, optionally, in combination of any embodiment described above or below, the exemplary trained neural network model may also be specified to include other parameters, including but not limited to, bias values/functions and/or aggregation functions. For example, an activation function of a node may be a step function, sine function, continuous or piecewise linear function, sigmoid function, hyperbolic tangent function, or other type of mathematical function that represents a threshold at which the node is activated. In some embodiments and, optionally, in combination of any embodiment described above or below, the exemplary aggregation function may be a mathematical function that combines (e.g., sum, product, etc.) input signals to the node. In some embodiments and, optionally, in combination of any embodiment described above or below, an output of the exemplary aggregation function may be used as input to the exemplary activation function. In some embodiments and, optionally, in combination of any embodiment described above or below, the bias may be a constant value or function that may be used by the aggregation function and/or the activation function to make the node more or less likely to be activated.

In some embodiments, the user may specify the security tiers, the authentication requirements for each security, the type of information assigned to each security tier, or a combination thereof. The CATCIS service 120 may automatically assign the information of each data item of user-related data to a matching security tier and manage sharing and third-party access to the user-related data in the user profile according to the authentication requirements of each security tier.

In some embodiments, the third-party may include a requesting computing device 105. In some embodiments, the requesting computing device 105 may include any suitable computing device, such as, e.g., a mobile device (e.g., smartphone, tablet, smartwatch, etc.), Internet-of-Things device, point-of-sale device, Internet-connected scanner or keypad, or other suitable computing device. In some embodiments, the requesting computing device 105 may require user-related data to complete a form or other set of data fields, e.g., to complete a transaction or other electronic activity. The requesting computing device 105 may request such data from the user profile of the user via the CATCIS service 120.

In some embodiments, to access the CATCIS service 120, the requesting computing device 105 may issue application programming interface (API) requests via a public API 130 in communication with the CATCIS service 120, either directly or via the bus 113. In some embodiments, the requesting computing device 105 may be required to register with the CATCIS service 120 to issue valid API requests, e.g., by registering a device identifier (ID) or third-party entity account associated with the requesting computing device 105. However, in some embodiments, the CATCIS service 120 may be an open service for any requesting computing device 105 providing valid API requests. In some embodiments, using an open approach may maintain security by relying on user explicit permission provided via the authentication requirements of the security tier assigned to the requested user-related data.

For example, in some embodiments, the authentication requirements of each security tier may include user-specific authentication credentials, such as, e.g., secret passwords, secret personal identification numbers (PINs), biometric credentials (e.g., fingerprints, iris scans, facial recognition, voice recognition, etc.), among other user-specific credentials. Thus, to access user-related data of a security tier, the user must provide the user-specific credentials at the requesting computing device 105 such that the requesting computing device 105 may satisfy authentication requirements associated with the security tier.

In some embodiments, the API request from the requesting computing device 105 may include, e.g., an electronic information request, the requisite authentication credentials for the security tier, the third-party entity ID, the device ID, among other data. In some embodiments, the CATCIS service 120 may receive the electronic information request via the public API 130 and compare the authentication credentials, and in some embodiments, the third-party entity or device ID of the requesting computing device 105 to determine if the authentication requirements of the security tier associated with the electronic information request is satisfied. If the authentication requirements are satisfied, the user-related data of the information request is shared with the requesting computing device 105, e.g., via the public API 130.

In some embodiments, where the user-related data of the electronic information request includes data items form multiple security tiers, the CATCIS service 120 may utilize the security tier with the most stringent authentication requirements as the authentication requirements for the electronic information request. Thus, the CATCIS service 120 may analyze each requested data item in the electronic information request, determine the security tier assigned for each requested data item, and identify the most stringent authentication requirements for the electronic information request.

In some embodiments, the requesting computing device 105 may perform automated processes with the shared information. For example, an application may be enabled (CATCIS-enabled application) to receive the user-related data of the information request and employ the user-related data to, e.g., populate data field of forms, account applications, electronic documents, an electronic profile or account with the third-party entity, or other uses. Accordingly, to facilitate such uses, the CATCIS service 120 may share the user-related data with data attributes indicating each type of information associated with each data item of the user-related. In some embodiments, the data attributes may include, e.g., metadata specifying the information type of each data item, appended data items to each data item specifying the information type, metadata specifying the requested data item in the electronic information request to which each data item of the user-related data corresponds, or by any other suitable technique.

Accordingly, in some embodiments, the CATCIS service 120 of the CATCIS system 110 facilitates secure and automated information sharing of user-related data by implementing a public API 130 for electronic information requests and the provision of user authentication of the electronic information requests to satisfy authentication requirements of security tiers to which the requested information belongs. Thus, the CATCIS system 110 may store a user profile or user account of secure user-related data secured in security tiers such that the sharing of such data may be automated while maintaining trust and confidentiality.

Figure 2:
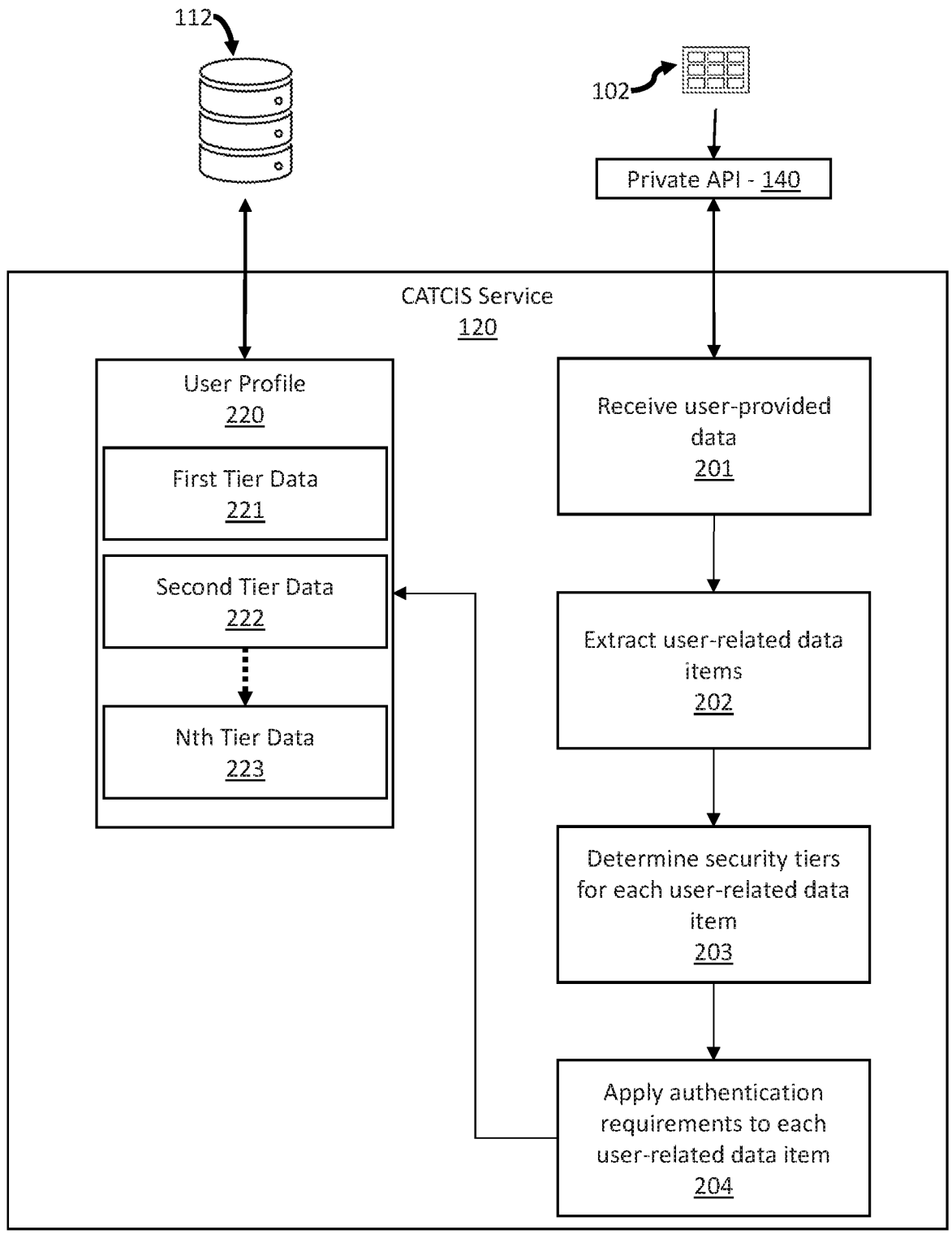

FIG. 2 is a block diagram of another exemplary computer-based system having a service to collect data for tiered security for the controlled automated tiered confidential information sharing system in accordance with one or more embodiments of the present disclosure.

In some embodiments, the CATCIS service 120 may manage user profiles 220 based on security tiers and user provided data 102. Accordingly, the CATCIS service 120 may receive the user provided data 102 and access the associated user profile 220, e.g., in the storage 112 of the CATCIS system 110. The user provided data 102 may be added to the user profile 220 according to the security tier of each data item in the user provided data 102.

In some embodiments, the user provided data 102 may be received at block 201 via an interfacing technique with a user computing device (e.g., user computing device 101). For example, in some embodiments, the user provided data 102 may be supplied via an API call using a private API 140. The private API 140 may be an API that is only accessible via an application associated with the CATCIS system 110 on the user computing device. In some embodiments, rather a private API 140, the user provided data 140 may be provided directly to the CATCIS service 120 via, e.g., a suitable message protocol (e.g., publish-subscribe, request-reply, push-pull, exclusive pair, or other synchronous or asynchronous message passing patterns). For example, the user provided data 102 may be provided over HTTP or HTTPS via a web browser, or using database messaging.

In some embodiments, the CATCIS service 120 may access the user profile 220 stored in the storage 112 of the CATCIS system 110. In some embodiments, the storage 112 may maintain user profiles 220 for each user registered with the CATCIS system 110. Each user profile 220 may include a sets of authentication requirements based on the types of user-related data. In some embodiments, each user profile 220 has first tier data 221, second data 222 through Nth tier data 223. In some embodiments, the user profile 220 includes one tier, two tiers, three tiers, four tiers, up to ten tiers or greater than ten tiers of data, with each tier having increasingly more stringent authentication requirements.

In some embodiments, to add the user provided data 102 to the user profile 220 of the user based on the user-related data and each user-related data item of the user-provided data 102. To do so, the CATCIS service 120 may extract the user-related data items from the user provided data 102 at block 202. In some embodiments, the user provided data 102 may be in the form of data entries into electronic form data fields or other data fields specifying a requested or optional type of data (e.g., age input, date-of-birth input, name input, etc.). Thus, each data item may include labels or attributes specifying an information type. Accordingly, the CATCIS service 120 may extract the user-related data items having particular labels or attributes.

In some embodiments, the user provided data 102 may be unstructured, or having an unknown structure. Accordingly, to extract the user-related data items, the CATCIS service 120 may implement data parsing models for automatically recognizing the user-related data items and the information types thereof.

In some embodiments, the data parsing models may include, e.g., template matching algorithms where a format of each data item is compared against template formats associated with user-related information types. Where a match is found, the CATCIS service 120 may determine that a data item has an information type of the matching template. The CATCIS service 120 may then extract the data items having the information types of the matching templates to extract the user-related data items.

In some embodiments, the data parsing models may include, e.g., machine learning algorithms, such as classifiers including, e.g., semantic segmentation, data classifiers, natural language processing, or other model types and combinations thereof. In some embodiments, the machine learning algorithms may ingest each data item and automatically generate a classification of information type for that data item. Where the information type matches a set of user-related information types, the associated data items may be extracted as user-related data items.

In some embodiments, user-related data items can include, e.g., data associated with a contact information types, such as, e.g., Name, City, State, Address, Telephone Number, Social Media accounts, etc. In some embodiments, user-related data items can include, e.g., data associated with a personally identifiable information types, such as, e.g., Name, Address, City, State, Contact Information, Age, DOB, Address History, FICO Scores, Employment Information, Salary Information, Education, Financial Assets Information, SSN, TIN, Vehicle Information, etc. In some embodiments, user-related data items can include, e.g., data associated with personally identifiable information types and financial information types, such as, e.g., Name, Address, City, State, Contact Information, Age, DOB, Address History, FICO Scores, Employment Info, Salary Info, Education, Financial Assets Information, SSN, TIN, Vehicle Information, Health Insurance Information, Dental Insurance Information, Vision Insurance Information, Supplemental Insurance Information, Driver's License Information, Vehicle Insurance Information, Vehicle Ownership Information, Credit Information, Mortgage Information, Loans Information, Family Information, Life Insurance Information, etc. In some embodiments, user-related data items can include, e.g., data associated with personally identifiable information types, financial information types, and medical information types, such as, e.g., Name, Address, City, State, Contact Information, Age, DOB, Address History, FICO Scores, Employment Information, Salary Information, Education, Financial Assets Information, SSN, TIN, Vehicle Information, Health Insurance Information, Dental Insurance Information, Vision Insurance Information, Supplemental Insurance Information, Driver's License Information, Vehicle Insurance Information, Vehicle Ownership Information, Credit Information, Mortgage Information, Loans Information, family Information, Life Insurance Information, Medical History, Court Records, etc. In some embodiments, the user-related data can be associated with information types such as those described above, among other suitable information user-related information and combinations thereof.

In some embodiments, upon extracting the user-related data items, the CATCIS system 120 may determine a security tier associated with each user-related data item at block 203. In some embodiments, the security tier may be based on the information type associated with each user-related data item. In some embodiments, the security tier establishes authentication requirements that may be used to access the data of the security tier upon satisfying the authentication requirements. Additionally, some user-related data items may have multiple information types, and thus be assignable to multiple security tiers. For example, a user's name may be in all information types, and thus assignable to all security tiers. As a result, the authentication requirements of any security tier may be used to access the user's name. Thus, for each user-related data item, the user-related data item may be assigned to each security tier for which the associated information type is assigned.

In some embodiments, the information types may have a hierarchy of confidentiality. Information types having greater confidentiality may be associated with higher security tiers. For example, personally identifiable information may have greater confidentiality than contact information, while financial data may have higher confidentiality than personally identifiable information, and medical data may have higher confidentiality than the financial data. Any information types and hierarchy of confidentiality thereof may be employed.

In some embodiments, the hierarchy of confidentiality, the security tiers, or both may be user defined. For example, the user may access their profile via the user computing device 101 interacting with the CATCIS service 120 to determine what level of multi factor authentication is required prior to having particular information retrieved. For instance, a user can decide a simple password is enough to share information in Tier 1 and populate associated fields in an online form. The same user can decide that a combination of password, what they know plus what they have like a device based authentication or what they are uniquely born with like retina/fingerprint etc. may be required for sharing and populating information classified as Tier 2. 3 etc. However, in some embodiments, the hierarchy of confidentiality, the security tiers, or both may be predefined, e.g., as a system default or by an administrator.

In some embodiments, based on the security tiers determined at block 203, the CATCIS service 120 may assign the security tiers to each user-related data item by applying the authentication requirements of each security tier to each user-related data item at 204. In some embodiments, assignment to a security tier may include, e.g., storing the user-related data item in a secure storage accessible only by the authentication requirements of the security tier. However, in some embodiments, to reduce data duplication by storing user-related data items in each appropriate security tier (e.g., storing the user's name in the secure storage of every security tier), the CATCIS system 120 may append attributes to each user-related data item specifying the appropriate security tiers to form first tier data 221, second tier data 222 through Nth tier data 223, and the CATCIS system 120 may then programmatically determine authentication requirements based on the requirements of the information type having the highest confidentiality requested by the requesting computing device 105. In some embodiments, the first tier data 221, second tier data 222 through Nth tier data 223 may be layered security tiers, such that user-related data attributes having information types with lower confidentiality may be accessible by more inclusive sets of authentication requirements, including the authentication requirements of security tiers above the lower confidentiality.

In some embodiments, the user profile 220 may be formed from the first tier data 221, second tier data 222 through Nth tier data 223, among other data. In some embodiments, the first tier data 221 may include, e.g., data associated with a contact information types, such as, e.g., Name, City, State, Address, Telephone Number, Social Media accounts, etc.

In some embodiments, the second tier data 222 may include, e.g., data associated with a personally identifiable information types, such as, e.g., Name, Address, City, State, Contact Information, Age, DOB, Address History, FICO Scores, Employment Information, Salary Information, Education, Financial Assets Information, SSN, TIN, Vehicle Information, etc.

In some embodiments, third tier data may include, e.g., data associated with personally identifiable information types and financial information types, such as, e.g., Name, Address, City, State, Contact Information, Age, DOB, Address History, FICO Scores, Employment Info, Salary Info, Education, Financial Assets Information, SSN, TIN, Vehicle Information, Health Insurance Information, Dental Insurance Information, Vision Insurance Information, Supplemental Insurance Information, Driver's License Information, Vehicle Insurance Information, Vehicle Ownership Information, Credit Information, Mortgage Information, Loans Information, Family Information, Life Insurance Information, etc.

In some embodiments, fourth tier data may include, e.g., data associated with personally identifiable information types, financial information types, and medical information types, such as, e.g., Name, Address, City, State, Contact Information, Age, DOB, Address History, FICO Scores, Employment Information, Salary Information, Education, Financial Assets Information, SSN, TIN, Vehicle Information, Health Insurance Information, Dental Insurance Information, Vision Insurance Information, Supplemental Insurance Information, Driver's License Information, Vehicle Insurance Information, Vehicle Ownership Information, Credit Information, Mortgage Information, Loans Information, family Information, Life Insurance Information, Medical History, Court Records, etc. In some embodiments, the user-related data can be associated with information types such as those described above, among other suitable information user-related information and combinations thereof.

In some embodiments, Nth tier data 223 may include any more sensitive information.

In some embodiments, upon applying the authentication requirements of the associated securities to each user-related data item, the CATCIS system 120 may return the user profile 220 with the user-related data items in the first tier data 221, second tier data 222 through Nth tier data 223 to the storage 112. In some embodiments, the CATCIS system 120 may then respond to requests for user-related data by accessing the storage 112, pulling the user profile 220 and determining the security tier of the user-related data in the request to request appropriate authentication requirements. In some embodiments, by assigning the user-related data items to security tiers based on each information type to which the user-related data item belongs, the CATCIS service 120 may quickly and efficiently determine the highest security tier of data for the request by determining the information type of the request, of each user-related data item, or both, and request authentication according to the authentication requirements of the highest security tier. Thus, the request may be quickly, efficiently, and securely responded to.

Figure 3:
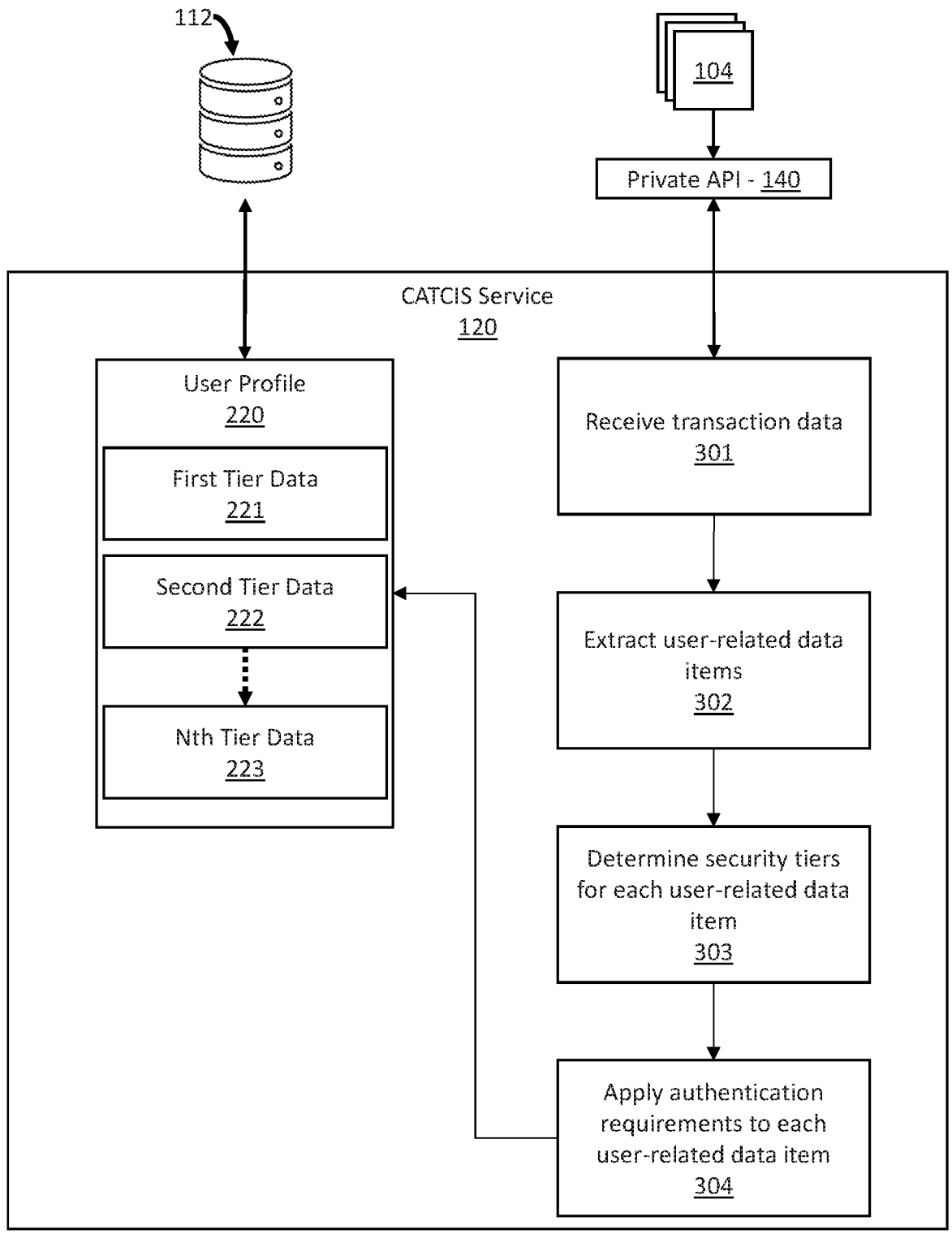

FIG. 3 is a block diagram of another exemplary computer-based system having a service to collect data for tiered security for the controlled automated tiered confidential information sharing system in accordance with one or more embodiments of the present disclosure.

In some embodiments, the CATCIS service 120 may manage user profiles 220 based on security tiers and user provided data 102. Accordingly, the CATCIS service 120 may receive the electronic activity data 104 and access the associated user profile 220, e.g., in the storage 112 of the CATCIS system 110. The user provided data 102 may be added to the user profile 220 according to the security tier of each data item in the electronic activity data 104.

In some embodiments, the electronic activity data 104 may be received at block 301 via an interfacing technique with a user computing device (e.g., user computing device 101). For example, in some embodiments, the user provided data 102 may be supplied via an API call using a private API 140. The private API 140 may be an API that is only accessible via an application associated with the CATCIS system 110 on the user computing device. In some embodiments, rather a private API 140, the electronic activity data 104 may be provided directly to the CATCIS service 120 via, e.g., a suitable message protocol (e.g., publish-subscribe, request-reply, push-pull, exclusive pair, or other synchronous or asynchronous message passing patterns). For example, the user provided data 102 may be provided over HTTP or HTTPS via a web browser, using an authentication request message, or using database messaging.

In some embodiments, the CATCIS service 120 may access the user profile 220 stored in the storage 112 of the CATCIS system 110. In some embodiments, the storage 112 may maintain user profiles 220 for each user registered with the CATCIS system 110. Each user profile 220 may include a sets of authentication requirements based on the types of user-related data. In some embodiments, each user profile 220 has first tier data 221, second data 222 through Nth tier data 223. In some embodiments, the user profile 220 includes one tier, two tiers, three tiers, four tiers, up to ten tiers or greater than ten tiers of data, with each tier having increasingly more stringent authentication requirements.

In some embodiments, to add the electronic activity data 104 to the user profile 220 of the user based on the user-related data and each user-related data item of the user-provided data 102. To do so, the CATCIS service 120 may extract the user-related data items from the user provided data 102 at block 302. In some embodiments, the electronic activity data 104 may be in the form of data entries into electronic form data fields (e.g., metadata, transaction authentication request data fields, or other suitable structured electronic activity data, etc.). Thus, each data item may include labels or attributes specifying an information type. Accordingly, the CATCIS service 120 may extract the user-related data items having particular labels or attributes.

In some embodiments, the electronic activity data 104 may be unstructured, or having an unknown structure. Accordingly, to extract the user-related data items, the CATCIS service 120 may implement data parsing models for automatically recognizing the user-related data items and the information types thereof.

In some embodiments, the data parsing models may include, e.g., template matching algorithms where a format of each data item is compared against template formats associated with user-related information types. Where a match is found, the CATCIS service 120 may determine that a data item has an information type of the matching template. The CATCIS service 120 may then extract the data items having the information types of the matching templates to extract the user-related data items.

In some embodiments, the data parsing models may include, e.g., machine learning algorithms, such as classifiers including, e.g., semantic segmentation, data classifiers, natural language processing, or other model types and combinations thereof. In some embodiments, the machine learning algorithms may ingest each data item and automatically generate a classification of information type for that data item. Where the information type matches a set of user-related information types, the associated data items may be extracted as user-related data items.

In some embodiments, user-related data items can include, e.g., data associated with a contact information types, such as, e.g., Name, City, State, Address, Telephone Number, Social Media accounts, etc. In some embodiments, user-related data items can include, e.g., data associated with a personally identifiable information types, such as, e.g., Name, Address, City, State, Contact Information, Age, DOB, Address History, FICO Scores, Employment Information, Salary Information, Education, Financial Assets Information, SSN, TIN, Vehicle Information, etc. In some embodiments, user-related data items can include, e.g., data associated with personally identifiable information types and financial information types, such as, e.g., Name, Address, City, State, Contact Information, Age, DOB, Address History, FICO Scores, Employment Info, Salary Info, Education, Financial Assets Information, SSN, TIN, Vehicle Information, Health Insurance Information, Dental Insurance Information, Vision Insurance Information, Supplemental Insurance Information, Driver's License Information, Vehicle Insurance Information, Vehicle Ownership Information, Credit Information, Mortgage Information, Loans Information, Family Information, Life Insurance Information, etc. In some embodiments, user-related data items can include, e.g., data associated with personally identifiable information types, financial information types, and medical information types, such as, e.g., Name, Address, City, State, Contact Information, Age, DOB, Address History, FICO Scores, Employment Information, Salary Information, Education, Financial Assets Information, SSN, TIN, Vehicle Information, Health Insurance Information, Dental Insurance Information, Vision Insurance Information, Supplemental Insurance Information, Driver's License Information, Vehicle Insurance Information, Vehicle Ownership Information, Credit Information, Mortgage Information, Loans Information, family Information, Life Insurance Information, Medical History, Court Records, etc. In some embodiments, the user-related data can be associated with information types such as those described above, among other suitable information user-related information and combinations thereof.

In some embodiments, upon extracting the user-related data items, the CATCIS system 120 may determine a security tier associated with each user-related data item at block 303. In some embodiments, the security tier may be based on the information type associated with each user-related data item. In some embodiments, the security tier establishes authentication requirements that may be used to access the data of the security tier upon satisfying the authentication requirements. Additionally, some user-related data items may have multiple information types, and thus be assignable to multiple security tiers. For example, a user's name may be in all information types, and thus assignable to all security tiers. As a result, the authentication requirements of any security tier may be used to access the user's name. Thus, for each user-related data item, the user-related data item may be assigned to each security tier for which the associated information type is assigned.

In some embodiments, the information types may have a hierarchy of confidentiality. Information types having greater confidentiality may be associated with higher security tiers. For example, personally identifiable information may have greater confidentiality than contact information, while financial data may have higher confidentiality than personally identifiable information, and medical data may have higher confidentiality than the financial data. Any information types and hierarchy of confidentiality thereof may be employed.

In some embodiments, the hierarchy of confidentiality, the security tiers, or both may be user defined. For example, the user may access their profile via the user computing device 101 interacting with the CATCIS service 120 to determine what level of multi factor authentication is required prior to having particular information retrieved. For instance, a user can decide a simple password is enough to share information in Tier 1 and populate associated fields in an online form. The same user can decide that a combination of password, what they know plus what they have like a device based authentication or what they are uniquely born with like retina/fingerprint etc. may be required for sharing and populating information classified as Tier 2. 3 etc. However, in some embodiments, the hierarchy of confidentiality, the security tiers, or both may be predefined, e.g., as a system default or by an administrator.

In some embodiments, based on the security tiers determined at block 303, the CATCIS service 120 may assign the security tiers to each user-related data item by applying the authentication requirements of each security tier to each user-related data item at 304. In some embodiments, assignment to a security tier may include, e.g., storing the user-related data item in a secure storage accessible only by the authentication requirements of the security tier. However, in some embodiments, to reduce data duplication by storing user-related data items in each appropriate security tier (e.g., storing the user's name in the secure storage of every security tier), the CATCIS system 120 may append attributes to each user-related data item specifying the appropriate security tiers to form first tier data 221, second tier data 222 through Nth tier data 223, and the CATCIS system 120 may then programmatically determine authentication requirements based on the requirements of the information type having the highest confidentiality requested by the requesting computing device 105. In some embodiments, the first tier data 221, second tier data 222 through Nth tier data 223 may be layered security tiers, such that user-related data attributes having information types with lower confidentiality may be accessible by more inclusive sets of authentication requirements, including the authentication requirements of security tiers above the lower confidentiality.

In some embodiments, the user profile 220 may be formed from the first tier data 221, second tier data 222 through Nth tier data 223, among other data. In some embodiments, the first tier data 221 may include, e.g., data associated with a contact information types, such as, e.g., Name, City, State, Address, Telephone Number, Social Media accounts, etc.

In some embodiments, the second tier data 222 may include, e.g., data associated with a personally identifiable information types, such as, e.g., Name, Address, City, State, Contact Information, Age, DOB, Address History, FICO Scores, Employment Information, Salary Information, Education, Financial Assets Information, SSN, TIN, Vehicle Information, etc.

In some embodiments, third tier data may include, e.g., data associated with personally identifiable information types and financial information types, such as, e.g., Name, Address, City, State, Contact Information, Age, DOB, Address History, FICO Scores, Employment Info, Salary Info, Education, Financial Assets Information, SSN, TIN, Vehicle Information, Health Insurance Information, Dental Insurance Information, Vision Insurance Information, Supplemental Insurance Information, Driver's License Information, Vehicle Insurance Information, Vehicle Ownership Information, Credit Information, Mortgage Information, Loans Information, Family Information, Life Insurance Information, etc.

In some embodiments, fourth tier data may include, e.g., data associated with personally identifiable information types, financial information types, and medical information types, such as, e.g., Name, Address, City, State, Contact Information, Age, DOB, Address History, FICO Scores, Employment Information, Salary Information, Education, Financial Assets Information, SSN, TIN, Vehicle Information, Health Insurance Information, Dental Insurance Information, Vision Insurance Information, Supplemental Insurance Information, Driver's License Information, Vehicle Insurance Information, Vehicle Ownership Information, Credit Information, Mortgage Information, Loans Information, family Information, Life Insurance Information, Medical History, Court Records, etc. In some embodiments, the user-related data can be associated with information types such as those described above, among other suitable information user-related information and combinations thereof.

In some embodiments, Nth tier data 223 may include any more sensitive information.

In some embodiments, upon applying the authentication requirements of the associated securities to each user-related data item, the CATCIS system 120 may return the user profile 220 with the user-related data items in the first tier data 221, second tier data 222 through Nth tier data 223 to the storage 112. In some embodiments, the CATCIS system 120 may then respond to requests for user-related data by accessing the storage 112, pulling the user profile 220 and determining the security tier of the user-related data in the request to request appropriate authentication requirements. In some embodiments, by assigning the user-related data items to security tiers based on each information type to which the user-related data item belongs, the CATCIS service 120 may quickly and efficiently determine the highest security tier of data for the request by determining the information type of the request, of each user-related data item, or both, and request authentication according to the authentication requirements of the highest security tier. Thus, the request may be quickly, efficiently, and securely responded to.

Figure 4:
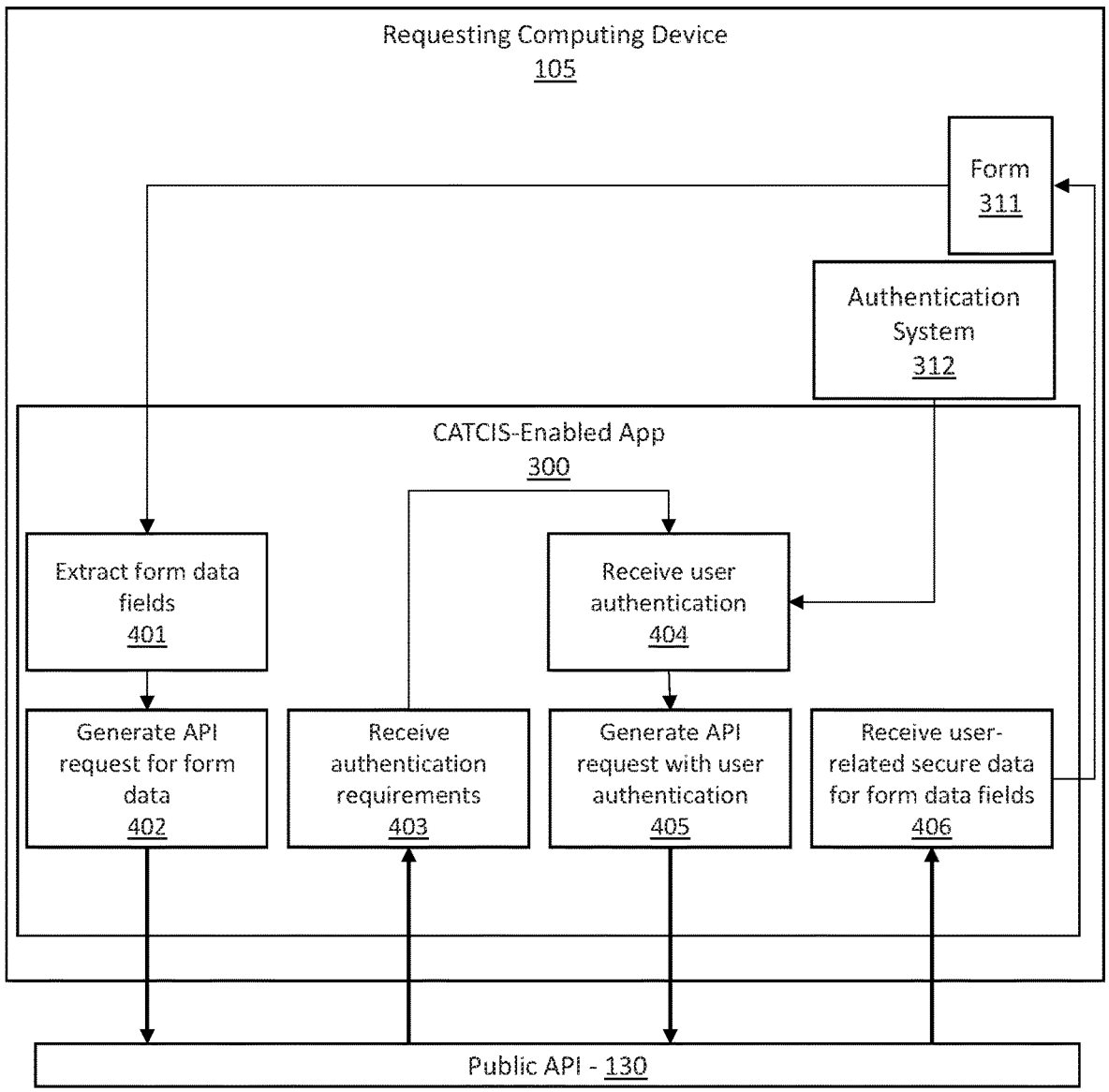

FIG. 4 is a block diagram of another exemplary computer-based system having a computing device for interfacing with using tiered security with a tiered confidential information sharing service of the controlled automated tiered confidential information sharing system in accordance with one or more embodiments of the present disclosure.

In some embodiments, the requesting computing device 105 may be configured to interact with the CATCIS system 110 in a secure manner to automatically produce forms or other digital or virtual information structures having fields for user-related data. To do so, the requesting computing device 105 may be provided with an automated formed production software application such as a CATCIS-enabled software application ("CATCIS-enabled app") 300. By interfacing with the CATCIS system 110, the CATCIS service 120 may automatically share confidential user information pertaining to a particular form 311. In some embodiments, the CATCIS-enabled app 300 automatically fills in the shared user information into the form 311.

In some embodiments, in order to access the user-related data of the user information for the form 311, the CATCIS-enabled app 300 may extract form data fields from the form 311 at block 401. In some embodiments, the form 311 may include a set of data field for input of user-related data for, e.g., a transaction, contract, application, or other fillable form. For example, in some embodiments, the form 311 may include data fields for, e.g., contact information, financial information, medical information, or other information, such as those described above. The CATCIS-enabled app 300 may be configured to scan or analyze the form 311 to identify the user-related data fields and create a list of the user-related data fields.

In some embodiments, the user-related data fields may be unstructured, or having an unknown structure. Accordingly, to extract the user-related data items, the CATCIS-enabled app 300 may implement data parsing models for automatically recognizing the user-related data fields and the information types thereof.

In some embodiments, the data parsing models may include, e.g., template matching algorithms where a format of each data field is compared against template formats associated with user-related information types. Where a match is found, the CATCIS-enabled app 300 may determine that a data field is for an information type of the matching template. The CATCIS-enabled app 300 may then extract the data fields and associated information types of the matching templates.

In some embodiments, the data parsing models may include, e.g., machine learning algorithms, such as classifiers including, e.g., semantic segmentation, data classifiers, natural language processing, or other model types and combinations thereof. In some embodiments, the machine learning algorithms may ingest each data item and automatically generate a classification of information type for that data field. Where the information type matches a set of user-related information types, the associated data fields and information types may be extracted as user-related data fields.

However, in some embodiments, form 311 may include structured data fields (e.g., according to metadata, format, or other structuring technique) configured to be used by the CATCIS-enabled app 300. Thus, the form 311 may be compatible with the CATCIS-enabled app 300 such that the CATCIS-enabled app 300 may receive the form 311 and automatically determine based on the structure the user-related data items and information types thereof.

In some embodiments, rather than extracting each individual user-related data item, the CATCIS-enabled app 300 may identify the information type of the form 311, e.g., according to a form type, such as, e.g., credit application, loan application, purchase-and-sale contract, vehicle purchase, or other suitable form having a defined type of information for filling out the data fields. The CATCIS-enabled app 300 may use the information type to produce a list or set of user-related data fields pertaining to the information type, e.g., according to a library or index of information types, or other suitable technique.

In some embodiments, the form 311 may require sensitive or confidential information, depending on the form type. Thus, the user-related data fields may be filled with confidential user information. The CATCIS-enabled app 300 may interact with CATCIS service 120 to retrieve user-related secure data representing the confidential user information such that each user-related data field of the form 311 may be filled. Accordingly, in some embodiments, the CATCIS-enabled app 300 may generate an API request for user-related data form the CATCIS system 110. In some embodiments, the API request may include a set of user-related secure data for each user-related data fields extracted from the form 311, the information type of each user-related data field, the information type of the form 311 or a combination thereof.

In some embodiments, the API request may be issued via the public API 130 to the CATCIS service 120 to request the user-related secure data for filling the form 311. However, to maintain securing of the confidential information, the CATCIS service 120 may respond with authentication requirements for a security tier associated with the user-related secure data, information type or both of the API request. In some embodiments, the CATCIS-enabled app 300 may receive the authentication requirements at block 403.

In some embodiments, the CATCIS-enabled app 300 utilizes the authentication requirements to activate an authentication system 312 of the requesting computing device 105. In some embodiments, the authentication system 312 may include, e.g., a text entry box for receiving a password or personal identification number (PIN), a fingerprint scanner, a facial recognition module, an iris scanner, among other authentication techniques and combinations thereof. Accordingly, in response to activating the authentication system 312, including producing a prompt to enter the required authentication credentials, the CATCIS-enabled app 300 may receive a user authentication response via the authentication system 312 at block 404. For example, the user may provide the password or PIN via a keypad or keyboard into the text entry box, biometric security scans including fingerprints, facial recognition, iris scans, or combinations thereof, or other user authentication responses.

In some embodiments, the CATCIS-enabled app 300 may automatically return the user authentication response according to the authentication requirements via an API request to the public API 130 at block 405. In some embodiments, the API request may include data representing the user authentication response, such as, e.g., a hash of the user authentication to encrypt the user authentication response for provision to the CATCIS service 120.

In some embodiments, where the user authentication response matches the credentials for the security tier of the user-related secure data in the CATCIS system 110, the CATCIS service 120 may automatically return the requested user-related secure data. The CATCIS-enabled app 300 may receive the user-related secure data via the public API 130. In some embodiments, the CATCIS-enabled app 300 may identify the respective user-related data field of the form 311 for each received user-related secure data item shared by the CATCIS service 120. For example, in some embodiments, the user-related secure data may be provided by including a list or table correlating each requested user-related secure data item (e.g., via an identifier of the information type, user-related data field, or other identifier or attribute) with the provided associated user-related secure data item from the user profile. In some embodiments, the provided user-related secured data items may instead be identified using data attributes or characteristics such as metadata, flags or labels, or other form of marking each user-related secure data item according to the user-related data field of the requested user-related secured data.

In some embodiments, based on the user-related data fields for each user-related secure data item, the CATCIS-enabled app 300 may automatically populate each data field of the form 311 using the user-related secured data items. Accordingly, without compromising the security of the user, the CATCIS-enabled app 300 may access confidential user information to fill a form for initiating or executing an activity at the requesting computing device 105.

Figure 5:
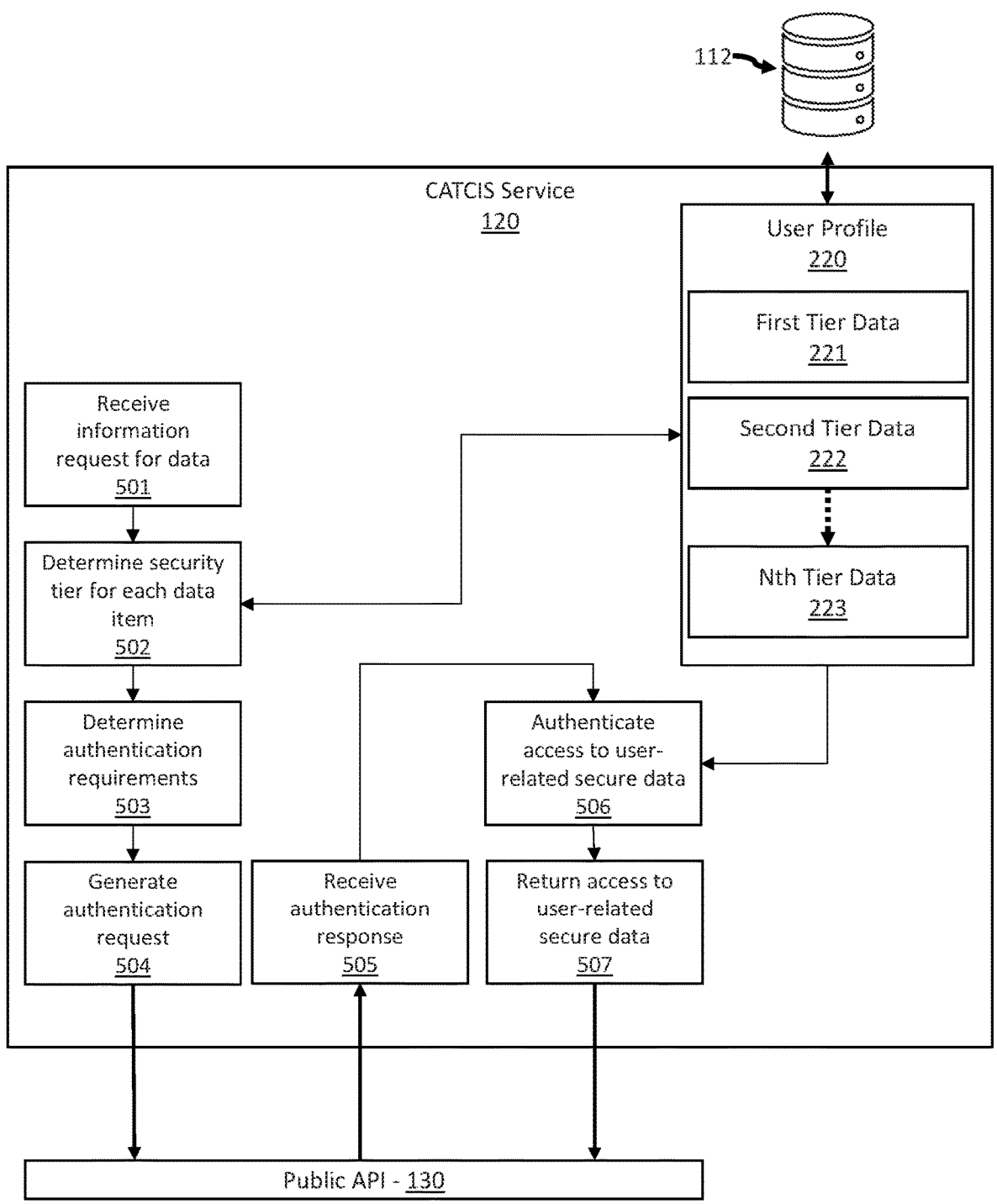

FIG. 5 is a block diagram of another exemplary computer-based system having tiered confidential information sharing service of the controlled automated tiered confidential information sharing system for interfacing with a computing device using tiered security in accordance with one or more embodiments of the present disclosure.

In some embodiments, the CATCIS service 120 may interact with the CATCIS-enabled app 300 to automatically share requested user-related secure data based upon user authentication according to the security tier for the user-related secure data. Accordingly, at block 501, the CATCIS service 120 may receive the electronic information request via the public API 130 from the CATCIS-enabled app 300. In some embodiments, the electronic information request may be any suitable format, such as, e.g., JSON via a JavaScript program (e.g., in a web browser) or by any other technique or format. Based on the information request, the CATCIS service 120 may automatically determine the authentication requirements for the requested information, and upon satisfaction of the authentication requirements, automatically share the information such that the form 311 may be automatically populated.

In some embodiments, the CATCIS service 120 receives the electronic information request at block 501 from a suitable automated form production software application, such as the CATCIS-enabled application 300 described above. In some embodiments, similar to the CATCIS-enabled application 300 described above, the automated form production software application may be associated with a third-party entity registered with the CATCIS system 110. In some embodiments, the submit the electronic information request, the CATCIS service 120 may require registration, e.g., of an account, of a device ID, or of another suitable identifier, to indicate that the automated form production software application or the requesting computing device (e.g., requesting computing device 105 described above) is authorized to participate in confidential information sharing.

In some embodiments, the electronic information request may include one or more identifiers of the information to be shared to the automated form production software application. In some embodiments, the information may include user-related secure data for a form, e.g., a financial account application, a loan application, a contract, a purchase-and-sale agreement, a tax form, a medical form, a credit application, or any other suitable form requiring user-related data. Accordingly, the electronic information request may specify the user-related secure data according to, e.g., a list, table, array or other data structure representing each individual user-related secure data item of the electronic information request.

However, in some embodiments, the electronic information request may specify the user-related secure data by specifying a form identifier or form type, which may be correlated to a set of user-related secure data items. In some embodiments, the CATCIS service 120 may access, e.g., an index or library of forms or form types, e.g., in the storage 112, to determine the set of user-related secure data items for the form identifier or the form type of the electronic information request. In some embodiments, the library or index may a global index of forms and form types for use with any CATCIS-enabled application 300 or other automated form production software application. However, in some embodiments, the third-party entity may register specific forms and form types that can be linked to the registered account, device ID, or other identifier for registering the account, of a device ID, or of another suitable identifier. Thus, the electronic information request may indirectly specify a set of user-related secure data items of the request by referencing the form or form type for which the user-related secure data items are to be used.

In some embodiments, the CATCIS service 120 may determine a request security tier for the electronic information request based on the security tier of each user-related secure data item associated with the electronic information request. In some embodiments, the CATCIS service 120 may analyze each user-related secure data item of the information request individually to determine its associated security tier, e.g., in the user profile 220 of a user associated with the electronic information request.

In some embodiments, because a higher security tier may utilize more strict authentication requirements than relatively lower security tiers, the CATCIS service 120 may use the greatest security tier assigned to the user-related secure data items of the electronic information request as the security tier for the electronic information request. However, in some embodiments, the CATCIS service 120 may use the form identifier or form type to determine a security associated with electronic information request.

In some embodiments, using the security tier of the electronic information request (the "request security tier"), the CATCIS service 120 may, at block 503, determine authentication requirements for authenticating access to the requested user-related secure data items. In some embodiments, each security tier includes authentication requirements based on the sensitivity or confidentiality of a user's user-related secure data. For more confidential user-related secure data, e.g., medical information, etc., the data may be higher tier data (e.g., third, fourth, or Nth tier data 223) according to the security tiers, and thus have higher authentication requirements (e.g., multifactor authentication with facial recognition or iris scanning, or other authentication requirements). In contrast, lower tier user-related secure data (e.g., first tier data 221), may have lower authentication requirements, such as a password, PIN and single factor authentication or multi-factor authentication. Depending on the security tier determined at block 502, the CATCIS service 120 may determine the authentication requirements that meet or exceed all user-related secure data of the electronic information request.

In some embodiments, the CATCIS service 120 may generate at block 504 a response to the electronic information request, e.g., via the public API 130, include an authentication request. In some embodiments, the authentication request communicates the authentication requirements to the automated form production software application such that the automated form production software application presents a user with the authentication requirements, user-input interface elements or functionality for the user to the provide authentication according to the authentication requirements, or both.

For example, for authentication requirements include a password or PIN, the automated form production software application may present an input field for user provision of the password or PIN. For biometric authentication requirements, the automated form production software application may automatically actuate biometric scanners and a prompt for biometric authentication (e.g., fingerprint scanning, facial recognition, iris scanning, etc.). For multi-factor authentication, the CATCIS service 120 may separately send an authentication code to a trusted device associated with the user profile 220, and the automated form production software application may present an input field for user provision of the authentication code, as well as one or more additional authentication methods. Other forms and formats of authentication may be employed.

In some embodiments, the authentication request may also include a request for user verification of the electronic information request, such as, e.g., verification of the type of each user-related secure data item being request, the form type or form name of the electronic information request, among other information, and combinations thereof.

In some embodiments, upon authentication at the automated form production software application, the CATCIS service 120 may receive, via the public API 130 at block 505, an authentication response including the user provided authentication. In some embodiments, the user may provide authentication at the third-party device of the automated form production software application, and where multi-factor authentication is used, as the trusted device associated with the user profile 220. In some embodiments, the authentication response may also include verification that the electronic information request is correct, e.g., according to the form identifier or form type, or the type of each user-related secure data item of the electronic information request.

In some embodiments, where the CATCIS service 120 requests user verification of the user-related secure data of the electronic information request, the CATCIS service 120 may restrict access or sharing of the user-related secure data even where the authentication response includes the user authentication. Similarly, where user verification is present, but the authentication is absent or incorrect, the access or sharing with respect to the user-related secure data may be restricted.

In some embodiments, where user authentication is present and correct based on the user profile 220 authentication requirements, and if the user verification of the requested information is present (if applicable), the CATCIS service 120 may authenticate access to the user-related secure data of the electronic information request. For example, the CATCIS service 120 may access the security tier for the user-related secure data items for the form of the electronic information request using the authentication response, and extract the requested user-related secure data items.

In some embodiments, upon accessing the user-related secure data, the CATCIS service 120 may automatically share the user-related secure data, e.g., as a JSON object, via the public API 130 at block 507. Thus, upon proper authentication according to the security tiers, the CATCIS service 120 may allow access to the security tier of data in the user profile 220 according to the electronic information request. In some embodiments, the user-related secure data may therefore be automatically and securely shared with the automated form production software application to auto-populate the data fields of form associated with the electronic information request.

Figure 6:
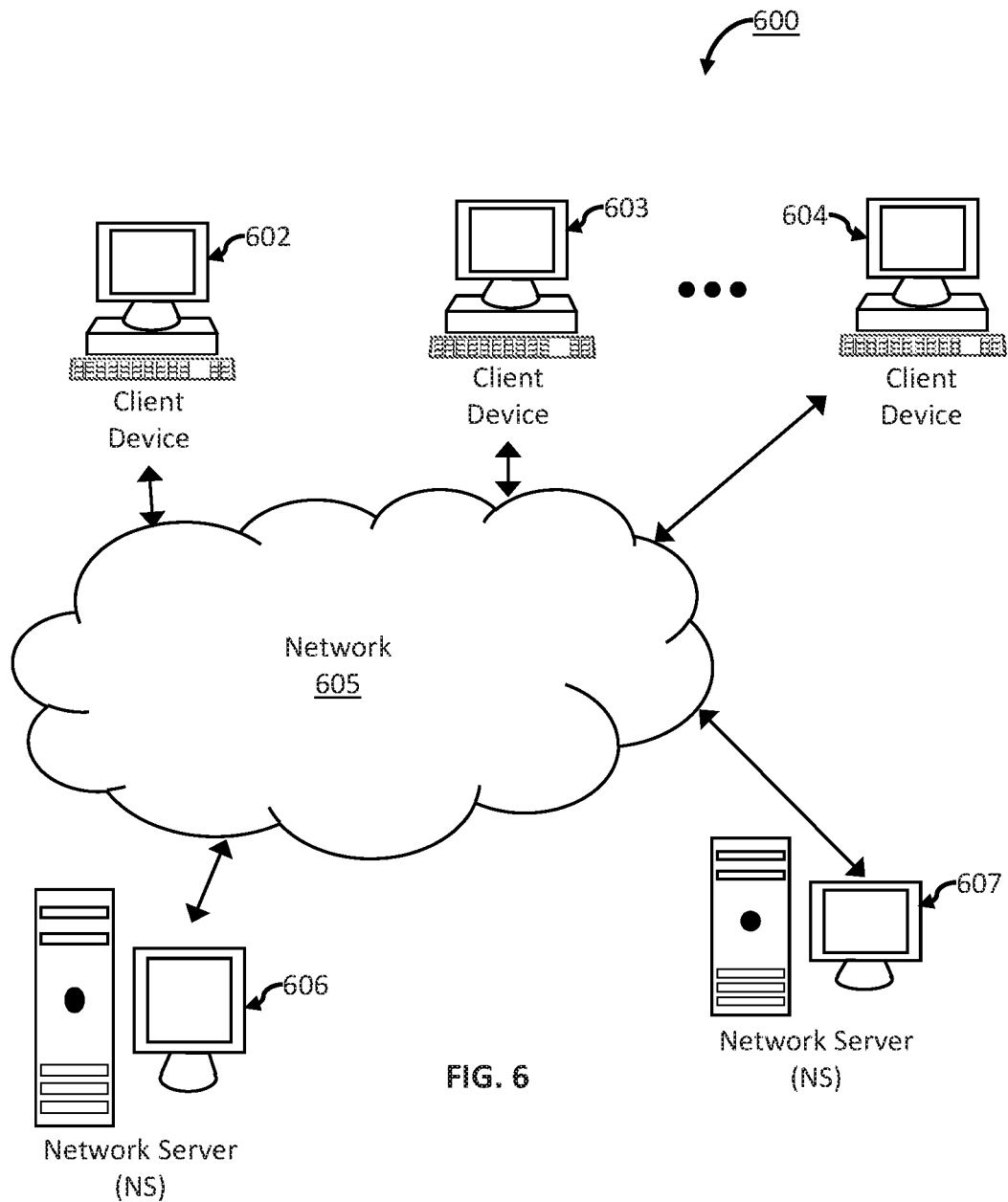

FIG. 6 depicts a block diagram of an exemplary computer-based system and platform 600 in accordance with one or more embodiments of the present disclosure. However, not all of these components may be required to practice one or more embodiments, and variations in the arrangement and type of the components may be made without departing from the spirit or scope of various embodiments of the present disclosure. In some embodiments, the illustrative computing devices and the illustrative computing components of the exemplary computer-based system and platform 600 may be configured to manage a large number of members and concurrent transactions, as detailed herein. In some embodiments, the exemplary computer-based system and platform 600 may be based on a scalable computer and network architecture that incorporates varies strategies for assessing the data, caching, searching, and/or database connection pooling. An example of the scalable architecture is an architecture that is capable of operating multiple servers.

In some embodiments, referring to FIG. 6, members 602-604 (e.g., clients) of the exemplary computer-based system and platform 600 may include virtually any computing device capable of receiving and sending a message over a network (e.g., cloud network), such as network 605, to and from another computing device, such as servers 606 and 607, each other, and the like. In some embodiments, the member devices 602-604 may be personal computers, multiprocessor systems, microprocessor-based or programmable consumer electronics, network PCs, and the like. In some embodiments, one or more member devices within member devices 602-604 may include computing devices that typically connect using a wireless communications medium such as cell phones, smart phones, pagers, walkie talkies, radio frequency (RF) devices, infrared (IR) devices, CBs, integrated devices combining one or more of the preceding devices, or virtually any mobile computing device, and the like. In some embodiments, one or more member devices within member devices 602-604 may be devices that are capable of connecting using a wired or wireless communication medium such as a PDA, POCKET PC, wearable computer, a laptop, tablet, desktop computer, a netbook, a video game device, a pager, a smart phone, an ultra-mobile personal computer (UMPC), and/or any other device that is equipped to communicate over a wired and/or wireless communication medium (e.g., NFC, RFID, NBIOT, 3G, 4G, 5G, GSM, GPRS, WiFi, WiMax, CDMA, satellite, ZigBee, etc.). In some embodiments, one or more member devices within member devices 602-604 may include may run one or more applications, such as Internet browsers, mobile applications, voice calls, video games, videoconferencing, and email, among others. In some embodiments, one or more member devices within member devices 602-604 may be configured to receive and to send web pages, and the like. In some embodiments, an exemplary specifically programmed browser application of the present disclosure may be configured to receive and display graphics, text, multimedia, and the like, employing virtually any web based language, including, but not limited to Standard Generalized Markup Language (SMGL), such as HyperText Markup Language (HTML), a wireless application protocol (WAP), a Handheld Device Markup Language (HDML), such as Wireless Markup Language (WML), WMLScript, XML, JavaScript, and the like. In some embodiments, a member device within member devices 602-604 may be specifically programmed by either Java, .Net, QT, C, C++ and/or other suitable programming language. In some embodiments, one or more member devices within member devices 602-604 may be specifically programmed include or execute an application to perform a variety of possible tasks, such as, without limitation, messaging functionality, browsing, searching, playing, streaming or displaying various forms of content, including locally stored or uploaded messages, images and/or video, and/or games.

In some embodiments, the exemplary network 605 may provide network access, data transport and/or other services to any computing device coupled to it. In some embodiments, the exemplary network 605 may include and implement at least one specialized network architecture that may be based at least in part on one or more standards set by, for example, without limitation, Global System for Mobile communication (GSM) Association, the Internet Engineering Task Force (IETF), and the Worldwide Interoperability for Microwave Access (WiMAX) forum. In some embodiments, the exemplary network 605 may implement one or more of a GSM architecture, a General Packet Radio Service (GPRS) architecture, a Universal Mobile Telecommunications System (UMTS) architecture, and an evolution of UMTS referred to as Long Term Evolution (LTE). In some embodiments, the exemplary network 605 may include and implement, as an alternative or in conjunction with one or more of the above, a WiMAX architecture defined by the WiMAX forum. In some embodiments and, optionally, in combination of any embodiment described above or below, the exemplary network 605 may also include, for instance, at least one of a local area network (LAN), a wide area network (WAN), the Internet, a virtual LAN (VLAN), an enterprise LAN, a layer 3 virtual private network (VPN), an enterprise IP network, or any combination thereof. In some embodiments and, optionally, in combination of any embodiment described above or below, at least one computer network communication over the exemplary network 605 may be transmitted based at least in part on one of more communication modes such as but not limited to: NFC, RFID, Narrow Band Internet of Things (NBIOT), ZigBee, 3G, 4G, 5G, GSM, GPRS, WiFi, WiMax, CDMA, satellite and any combination thereof. In some embodiments, the exemplary network 605 may also include mass storage, such as network attached storage (NAS), a storage area network (SAN), a content delivery network (CDN) or other forms of computer or machine readable media.

In some embodiments, the exemplary server 606 or the exemplary server 607 may be a web server (or a series of servers) running a network operating system, examples of which may include but are not limited to Microsoft Windows Server, Novell NetWare, or Linux. In some embodiments, the exemplary server 606 or the exemplary server 607 may be used for and/or provide cloud and/or network computing. Although not shown in FIG. 6, in some embodiments, the exemplary server 606 or the exemplary server 607 may have connections to external systems like email, SMS messaging, text messaging, ad content providers, etc. Any of the features of the exemplary server 606 may be also implemented in the exemplary server 607 and vice versa.

In some embodiments, one or more of the exemplary servers 606 and 607 may be specifically programmed to perform, in non-limiting example, as authentication servers, search servers, email servers, social networking services servers, SMS servers, IM servers, MMS servers, exchange servers, photo-sharing services servers, advertisement providing servers, financial/banking-related services servers, travel services servers, or any similarly suitable service-base servers for users of the member computing devices 601-604.

In some embodiments and, optionally, in combination of any embodiment described above or below, for example, one or more exemplary computing member devices 602-604, the exemplary server 606, and/or the exemplary server 607 may include a specifically programmed software module that may be configured to send, process, and receive information using a scripting language, a remote procedure call, an email, a tweet, Short Message Service (SMS), Multimedia Message Service (MMS), instant messaging (IM), internet relay chat (IRC), mIRC, Jabber, an application programming interface, Simple Object Access Protocol (SOAP) methods, Common Object Request Broker Architecture (CORBA), HTTP (Hypertext Transfer Protocol), REST (Representational State Transfer), or any combination thereof.

Figure 7:
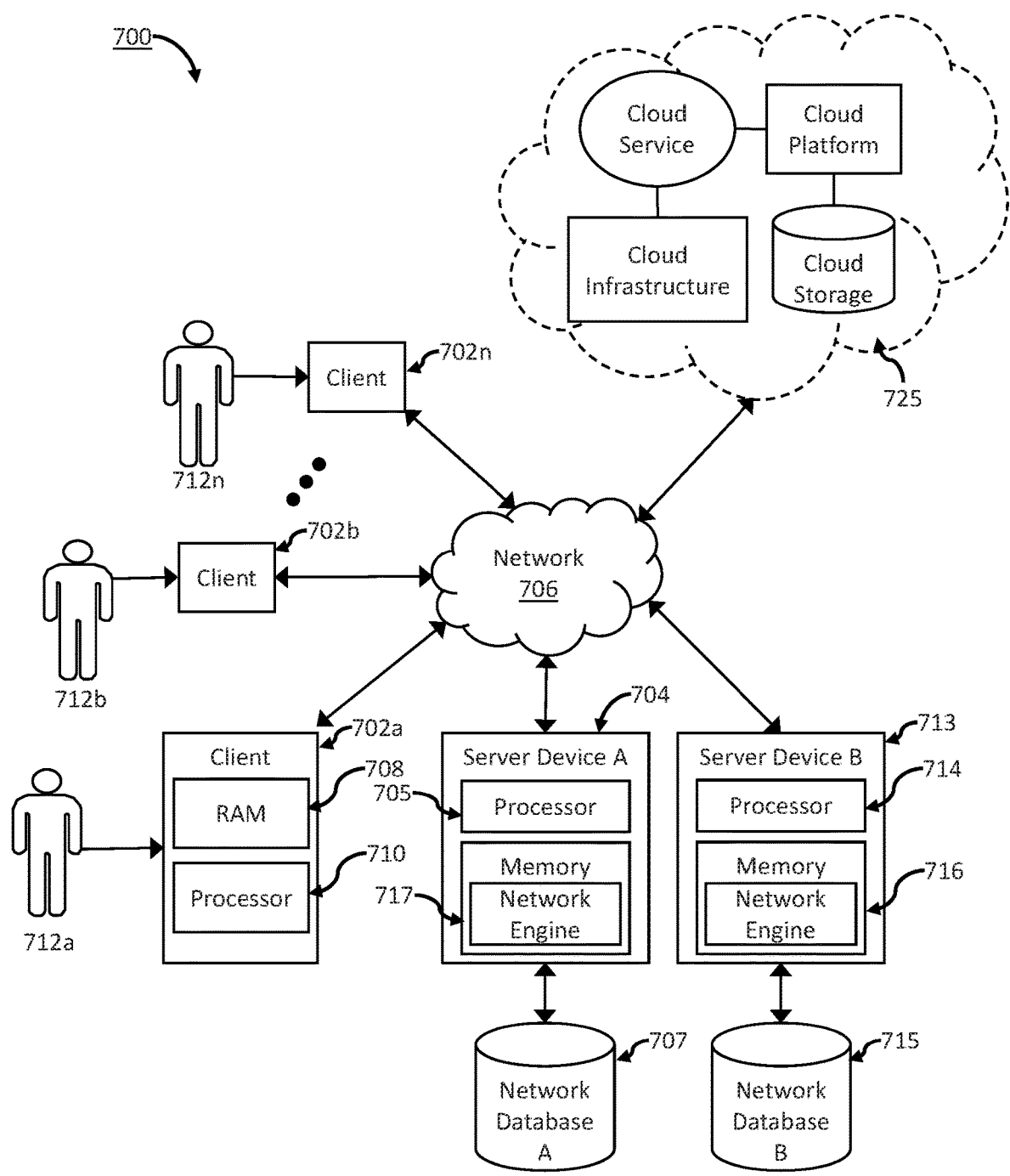

FIG. 7 depicts a block diagram of another exemplary computer-based system and platform 700 in accordance with one or more embodiments of the present disclosure. However, not all of these components may be required to practice one or more embodiments, and variations in the arrangement and type of the components may be made without departing from the spirit or scope of various embodiments of the present disclosure. In some embodiments, the member computing devices 702a, 702b thru 702n shown each at least includes a computer-readable medium, such as a random-access memory (RAM) 708 coupled to a processor 710 or FLASH memory. In some embodiments, the processor 710 may execute computer-executable program instructions stored in memory 708. In some embodiments, the processor 710 may include a microprocessor, an ASIC, and/or a state machine. In some embodiments, the processor 710 may include, or may be in communication with, media, for example computer-readable media, which stores instructions that, when executed by the processor 710, may cause the processor 710 to perform one or more steps described herein. In some embodiments, examples of computer-readable media may include, but are not limited to, an electronic, optical, magnetic, or other storage or transmission device capable of providing a processor, such as the processor 710 of client 702a, with computer-readable instructions. In some embodiments, other examples of suitable media may include, but are not limited to, a floppy disk, CD-ROM, DVD, magnetic disk, memory chip, ROM, RAM, an ASIC, a configured processor, all optical media, all magnetic tape or other magnetic media, or any other medium from which a computer processor can read instructions. Also, various other forms of computer-readable media may transmit or carry instructions to a computer, including a router, private or public network, or other transmission device or channel, both wired and wireless. In some embodiments, the instructions may comprise code from any computer-programming language, including, for example, C, C++, Visual Basic, Java, Python, Perl, JavaScript, and etc.

In some embodiments, member computing devices 702a through 702n may also comprise a number of external or internal devices such as a mouse, a CD-ROM, DVD, a physical or virtual keyboard, a display, or other input or output devices. In some embodiments, examples of member computing devices 702a through 702n (e.g., clients) may be any type of processor-based platforms that are connected to a network 706 such as, without limitation, personal computers, digital assistants, personal digital assistants, smart phones, pagers, digital tablets, laptop computers, Internet appliances, and other processor-based devices. In some embodiments, member computing devices 702a through 702n may be specifically programmed with one or more application programs in accordance with one or more principles/methodologies detailed herein. In some embodiments, member computing devices 702a through 702n may operate on any operating system capable of supporting a browser or browser-enabled application, such as Microsoft™ Windows™, and/or Linux. In some embodiments, member computing devices 702a through 702n shown may include, for example, personal computers executing a browser application program such as Microsoft Corporation's Internet Explorer™, Apple Computer, Inc.'s Safari™, Mozilla Firefox, and/or Opera. In some embodiments, through the member computing client devices 702a through 702n, users, 712a through 702n, may communicate over the exemplary network 706 with each other and/or with other systems and/or devices coupled to the network 706. As shown in FIG. 7, exemplary server devices 704 and 713 may be also coupled to the network 706. In some embodiments, one or more member computing devices 702a through 702n may be mobile clients.

In some embodiments, at least one database of exemplary databases 707 and 715 may be any type of database, including a database managed by a database management system (DBMS). In some embodiments, an exemplary DBMS-managed database may be specifically programmed as an engine that controls organization, storage, management, and/or retrieval of data in the respective database. In some embodiments, the exemplary DBMS-managed database may be specifically programmed to provide the ability to query, backup and replicate, enforce rules, provide security, compute, perform change and access logging, and/or automate optimization. In some embodiments, the exemplary DBMS-managed database may be chosen from Oracle database, IBM DH2, Adaptive Server Enterprise, FileMaker, Microsoft Access, Microsoft SQL Server, MySQL, PostgreSQL, and a NoSQL implementation. In some embodiments, the exemplary DBMS-managed database may be specifically programmed to define each respective schema of each database in the exemplary DBMS, according to a particular database model of the present disclosure which may include a hierarchical model, network model, relational model, object model, or some other suitable organization that may result in one or more applicable data structures that may include fields, records, files, and/or objects. In some embodiments, the exemplary DBMS-managed database may be specifically programmed to include metadata about the data that is stored.

Figure 8:
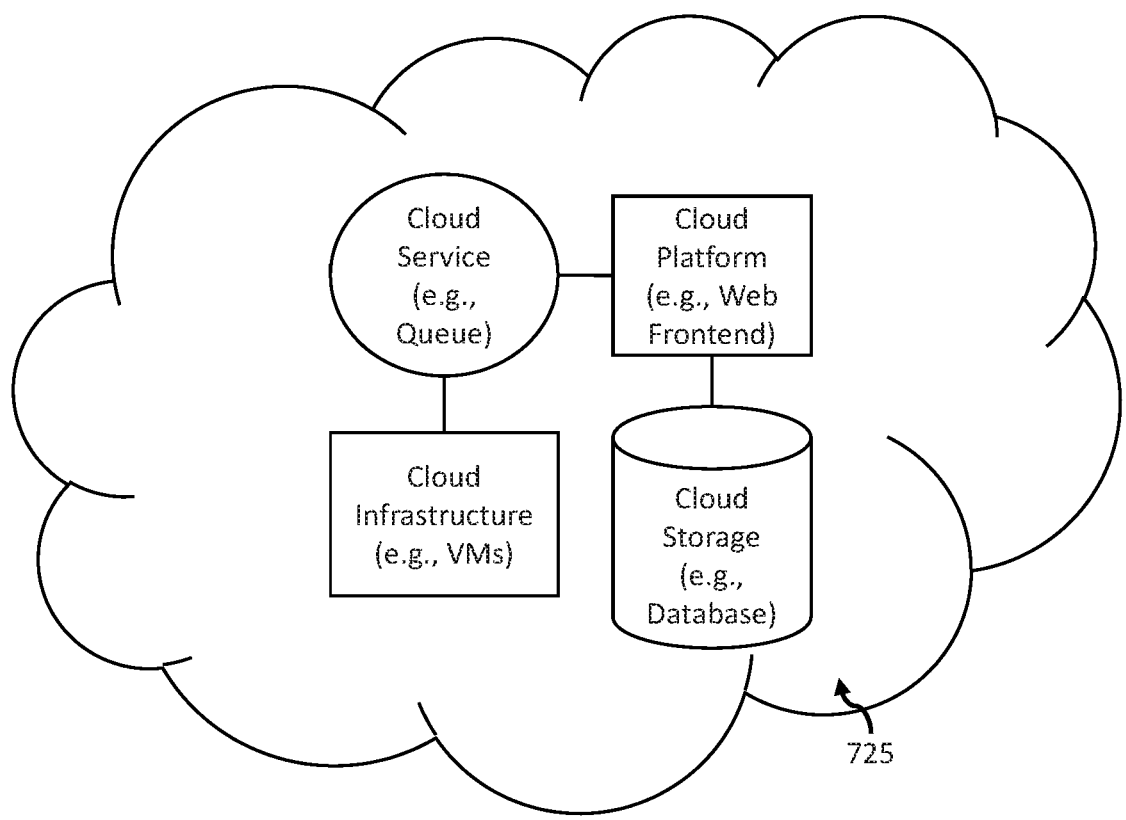
Figure 9:
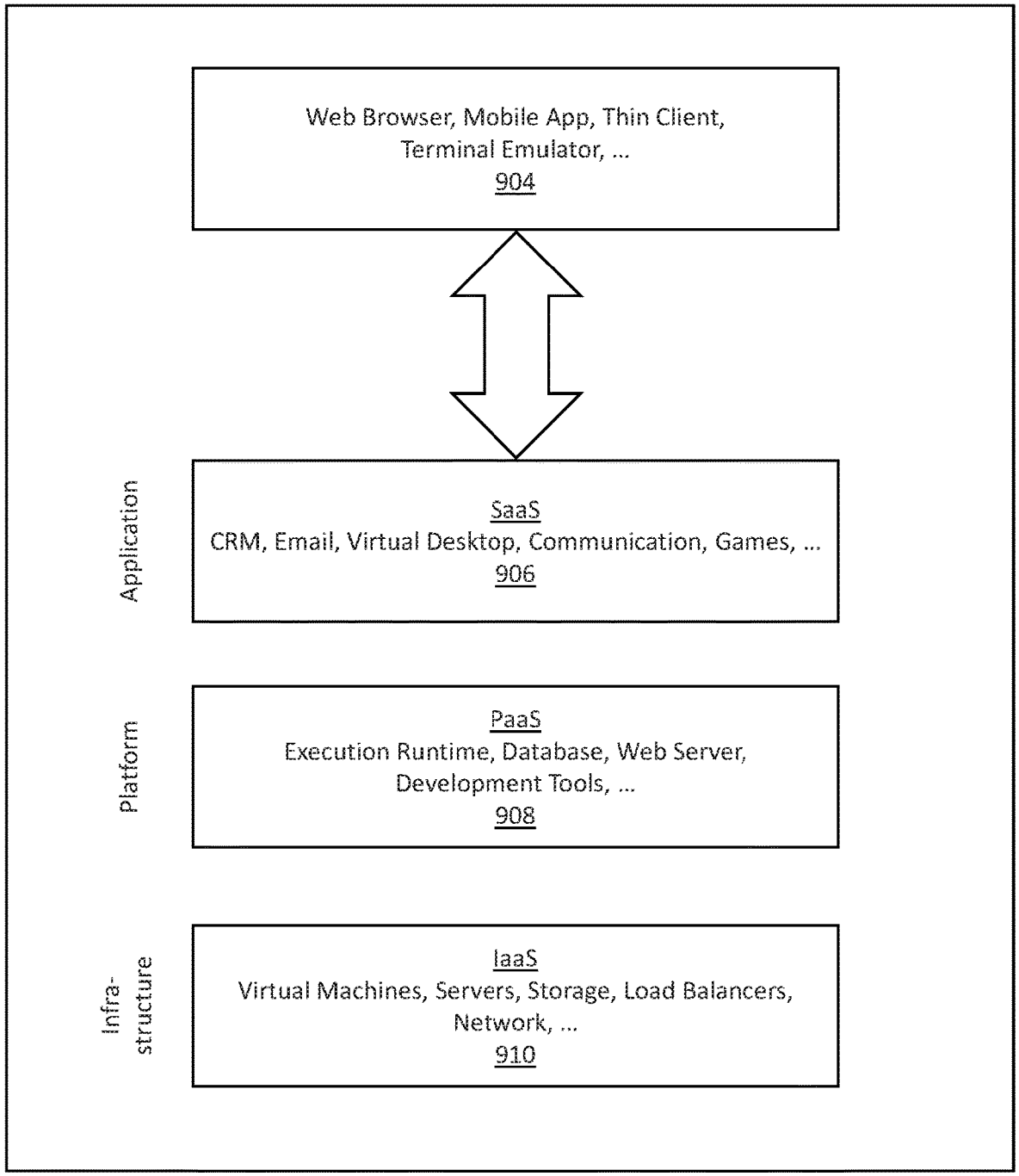

In some embodiments, the exemplary inventive computer-based systems/platforms, the exemplary inventive computer-based devices, and/or the exemplary inventive computer-based components of the present disclosure may be specifically configured to operate in a cloud computing/architecture 725 such as, but not limiting to: infrastructure a service (IaaS) 910, platform as a service (PaaS) 908, and/or software as a service (SaaS) 906 using a web browser, mobile app, thin client, terminal emulator or other endpoint 904. FIGS. 8 and 9 illustrate schematics of exemplary implementations of the cloud computing/architecture(s) in which the exemplary inventive computer-based systems/platforms, the exemplary inventive computer-based devices, and/or the exemplary inventive computer-based components of the present disclosure may be specifically configured to operate.

It is understood that at least one aspect/functionality of various embodiments described herein can be performed in real-time and/or dynamically. As used herein, the term "real-time" is directed to an event/action that can occur instantaneously or almost instantaneously in time when another event/action has occurred. For example, the "real-time processing," "real-time computation," and "real-time execution" all pertain to the performance of a computation during the actual time that the related physical process (e.g., a user interacting with an application on a mobile device) occurs, in order that results of the computation can be used in guiding the physical process.

As used herein, the term "dynamically" and term "automatically," and their logical and/or linguistic relatives and/or derivatives, mean that certain events and/or actions can be triggered and/or occur without any human intervention. In some embodiments, events and/or actions in accordance with the present disclosure can be in real-time and/or based on a predetermined periodicity of at least one of: nanosecond, several nanoseconds, millisecond, several milliseconds, second, several seconds, minute, several minutes, hourly, several hours, daily, several days, weekly, monthly, etc.

As used herein, the term "runtime" corresponds to any behavior that is dynamically determined during an execution of a software application or at least a portion of software application.

In some embodiments, exemplary inventive, specially programmed computing systems and platforms with associated devices are configured to operate in the distributed network environment, communicating with one another over one or more suitable data communication networks (e.g., the Internet, satellite, etc.) and utilizing one or more suitable data communication protocols/modes such as, without limitation, IPX/SPX, X.25, AX.25, AppleTalk™, TCP/IP (e.g., HTTP), near-field wireless communication (NFC), RFID, Narrow Band Internet of Things (NBIOT), 3G, 4G, 5G, GSM, GPRS, WiFi, WiMax, CDMA, satellite, ZigBee, and other suitable communication modes. In some embodiments, the NFC can represent a short-range wireless communications technology in which NFC-enabled devices are "swiped," "bumped," "tap" or otherwise moved in close proximity to communicate.

The material disclosed herein may be implemented in software or firmware or a combination of them or as instructions stored on a machine-readable medium, which may be read and executed by one or more processors. A machine-readable medium may include any medium and/or mechanism for storing or transmitting information in a form readable by a machine (e.g., a computing device). For example, a machine-readable medium may include read only memory (ROM); random access memory (RAM); magnetic disk storage media; optical storage media; flash memory devices; electrical, optical, acoustical or other forms of propagated signals (e.g., carrier waves, infrared signals, digital signals, etc.), and others.

Computer-related systems, computer systems, and systems, as used herein, include any combination of hardware and software. Examples of software may include software components, programs, applications, operating system software, middleware, firmware, software modules, routines, subroutines, functions, methods, procedures, software interfaces, application program interfaces (API), instruction sets, computer code, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that make the logic or processor. Of note, various embodiments described herein may, of course, be implemented using any appropriate hardware and/or computing software languages (e.g., C++, Objective-C, Swift, Java, JavaScript, Python, Perl, QT, etc.).

In some embodiments, one or more of illustrative computer-based systems or platforms of the present disclosure may include or be incorporated, partially or entirely into at least one personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, and so forth.

As used herein, the term "server" should be understood to refer to a service point which provides processing, database, and communication facilities. By way of example, and not limitation, the term "server" can refer to a single, physical processor with associated communications and data storage and database facilities, or it can refer to a networked or clustered complex of processors and associated network and storage devices, as well as operating software and one or more database systems and application software that support the services provided by the server. Cloud servers are examples.

In some embodiments, as detailed herein, one or more of the computer-based systems of the present disclosure may obtain, manipulate, transfer, store, transform, generate, and/or output any digital object and/or data unit (e.g., from inside and/or outside of a particular application) that can be in any suitable form such as, without limitation, a file, a contact, a task, an email, a message, a map, an entire application (e.g., a calculator), data points, and other suitable data. In some embodiments, as detailed herein, one or more of the computer-based systems of the present disclosure may be implemented across one or more of various computer platforms such as, but not limited to: (1) Linux, (2) Microsoft Windows, (3) OS X (Mac OS), (4) Solaris, (5) UNIX (6) VMWare, (7) Android, (8) Java Platforms, (9) Open Web Platform, (10) Kubernetes or other suitable computer platforms. In some embodiments, illustrative computer-based systems or platforms of the present disclosure may be configured to utilize hardwired circuitry that may be used in place of or in combination with software instructions to implement features consistent with principles of the disclosure. Thus, implementations consistent with principles of the disclosure are not limited to any specific combination of hardware circuitry and software. For example, various embodiments may be embodied in many different ways as a software component such as, without limitation, a stand-alone software package, a combination of software packages, or it may be a software package incorporated as a "tool" in a larger software product.

For example, exemplary software specifically programmed in accordance with one or more principles of the present disclosure may be downloadable from a network, for example, a website, as a stand-alone product or as an add-in package for installation in an existing software application. For example, exemplary software specifically programmed in accordance with one or more principles of the present disclosure may also be available as a client-server software application, or as a web-enabled software application. For example, exemplary software specifically programmed in accordance with one or more principles of the present disclosure may also be embodied as a software package installed on a hardware device.

In some embodiments, illustrative computer-based systems or platforms of the present disclosure may be configured to handle numerous concurrent users that may be, but is not limited to, at least 100 (e.g., but not limited to, 100-999), at least 1,000 (e.g., but not limited to, 1,000-9,999), at least 10,000 (e.g., but not limited to, 10,000-99,999), at least 100,000 (e.g., but not limited to, 100,000-999,999), at least 1,000,000 (e.g., but not limited to, 1,000,000-9,999,999), at least 10,000,000 (e.g., but not limited to, 10,000,000-99,999,999), at least 100,000,000 (e.g., but not limited to, 100,000,000-999,999,999), at least 1,000,000,000 (e.g., but not limited to, 1,000,000,000-999,999,999,999), and so on.

In some embodiments, illustrative computer-based systems or platforms of the present disclosure may be configured to output to distinct, specifically programmed graphical user interface implementations of the present disclosure (e.g., a desktop, a web app., etc.). In various implementations of the present disclosure, a final output may be displayed on a displaying screen which may be, without limitation, a screen of a computer, a screen of a mobile device, or the like. In various implementations, the display may be a holographic display. In various implementations, the display may be a transparent surface that may receive a visual projection. Such projections may convey various forms of information, images, or objects. For example, such projections may be a visual overlay for a mobile augmented reality (MAR) application.

In some embodiments, illustrative computer-based systems or platforms of the present disclosure may be configured to be utilized in various applications which may include, but not limited to, gaming, mobile-device games, video chats, video conferences, live video streaming, video streaming and/or augmented reality applications, mobile-device messenger applications, and others similarly suitable computer-device applications.

As used herein, the term "mobile electronic device," or the like, may refer to any portable electronic device that may or may not be enabled with location tracking functionality (e.g., MAC address, Internet Protocol (IP) address, or the like). For example, a mobile electronic device can include, but is not limited to, a mobile phone, Personal Digital Assistant (PDA), Blackberry™, Pager, Smartphone, or any other reasonable mobile electronic device.

As used herein, the terms "cloud," "Internet cloud," "cloud computing," "cloud architecture," and similar terms correspond to at least one of the following: (1) a large number of computers connected through a real-time communication network (e.g., Internet); (2) providing the ability to run a program or application on many connected computers (e.g., physical machines, virtual machines (VMs)) at the same time; (3) network-based services, which appear to be provided by real server hardware, and are in fact served up by virtual hardware (e.g., virtual servers), simulated by software running on one or more real machines (e.g., allowing to be moved around and scaled up (or down) on the fly without affecting the end user).

In some embodiments, the illustrative computer-based systems or platforms of the present disclosure may be configured to securely store and/or transmit data by utilizing one or more of encryption techniques (e.g., private/public key pair, Triple Data Encryption Standard (3DES), block cipher algorithms (e.g., IDEA, RC2, RC5, CAST and Skipjack), cryptographic hash algorithms (e.g., MD5, RIPEMD-160, RTR0, SHA-1, SHA-2, Tiger (TTH), WHIRLPOOL, RNGs).

The aforementioned examples are, of course, illustrative and not restrictive.

As used herein, the term "user" shall have a meaning of at least one user. In some embodiments, the terms "user", "subscriber" "consumer" or "customer" should be understood to refer to a user of an application or applications as described herein and/or a consumer of data supplied by a data provider. By way of example, and not limitation, the terms "user" or "subscriber" can refer to a person who receives data provided by the data or service provider over the Internet in a browser session, or can refer to an automated software application which receives the data and stores or processes the data.

At least some aspects of the present disclosure will now be described with reference to the following numbered clauses.

Clause 1. A method comprising:
  receiving, by at least one processor, an electronic information request from an automated form production application of a computing device associated with a third-party entity;
    wherein the electronic information request comprises user-related secure data associated with at least one form;
    wherein the user-related secure data is associated with an account of a user;
  determining, by the at least one processor, a request security tier associated with the electronic information request according to an assigned security tier of each item of the user-related secure data;
  determining, by the at least one processor, at least one authentication requirement associated with the request security tier according to authentication settings of the assigned security tier of each item of the user-related secure data;
    wherein the at least one authentication requirement comprises a set of user authentication methods based on the request security tier;
  generating, by the at least one processor, an authentication request enabling the user to provide user authentication response to the at least one authentication requirement to approve the computing device associated with the third-party entity for access to the user-related secure data;
  receiving, by the at least one processor, the user authentication response from the user in response to the at least one authentication requirement;
  authenticating, by the at least one processor, the user based on the user authentication response; and
  allowing, by the at least one processor, the computing device associated with the third-party entity to access the user-related secure data associated the electronic information request in response to the authentication of the user; and
    wherein the automated form production application auto-populates each field of the electronic form with associated items of the user-related secure data.

Clause 2. A system comprising:
  at least one processor configured to implement instructions stored in a non-transitory computer readable medium causing the at least one processor to perform steps to:
    receive an electronic information request from an automated form production application of a computing device associated with a third-party entity;
      wherein the electronic information request comprises user-related secure data associated with at least one form;
      wherein the user-related secure data is associated with an account of a user;
    determine a request security tier associated with the electronic information request according to an assigned security tier of each item of the user-related secure data;
    determine at least one authentication requirement associated with the request security tier according to authentication settings of the assigned security tier of each item of the user-related secure data;
      wherein the at least one authentication requirement comprises a set of user authentication methods based on the request security tier;
    generate an authentication request enabling the user to provide user authentication response to the at least one authentication requirement to approve the computing device associated with the third-party entity for access to the user-related secure data;
    receive the user authentication response from the user in response to the at least one authentication requirement;
    authenticate the user based on the user authentication response; and
    allow the computing device associated with the third-party entity to access the user-related secure data associated the electronic information request in response to the authentication of the user; and
      wherein the automated form production application auto-populates each field of the electronic form with associated items of the user-related secure data.

Clause 3. The system or method of clauses 1 and/or 2, further comprising:
  identifying, by the at least one processor, each security classification associated with the user-related secure data of each item of the user-related secure data;
  determining, by the at least one processor, each security tier of each security classification; and
  determining, by the at least one processor, the request security tier as a most secure security tier based on a hierarchy of security tiers.

Clause 4. The system or method of clause 3, wherein the hierarchy of security tiers comprises more secure authentication requirements for a greater level of security tier in the hierarchy of security tiers.

Clause 5. The system or method of clauses 1 and/or 2, further comprising determining, by the at least one processor, the assigned security tier of each item of the user-related secure data based on an information type of each item of the user-related secure data.

Clause 6. The system or method of clauses 1 and/or 2, wherein the user-related secure data associated each item of the user-related secure data comprises at least one JSON file stored in a user account.

Clause 7. The system or method of clauses 1 and/or 2, wherein the automated form production application is configured to parse the user-related secure data according to fields of the at least one form to auto-populate the fields with the user-related secure data.

Clause 8. The system or method of clauses 1 and/or 2, wherein assigned security tier of each item of the user-related secure data are user-defined.

Clause 9. The system or method of clauses 1 and/or 2, wherein assigned security tier of each item of the user-related secure data are predetermined based on types of information.

Clause 10. The system or method of clauses 1 and/or 2, further comprising:
  determining, by the at least one processor, a type of information of each item of the requested information; and
  determining, by the at least one processor, the assigned security tier of each item of the requested information based at least in part on the type of information of each item of the requested information.

Clause 11. The system or method of clauses 1 and/or 2, further comprising restricting, by the at least one processor, access to the user-related secure data associated with each item of the user-related secure data by the automated form production application until a user verification input verifying the user-related secure data associated with each item of the user-related secure data.

While one or more embodiments of the present disclosure have been described, it is understood that these embodiments are illustrative only, and not restrictive, and that many modifications may become apparent to those of ordinary skill in the art, including that various embodiments of the inventive methodologies, the illustrative systems and platforms, and the illustrative devices described herein can be utilized in any combination with each other. Further still, the various steps may be carried out in any desired order (and any desired steps may be added and/or any desired steps may be eliminated).

The invention claimed is:

1. A method comprising:
  receiving, by at least one processor, an electronic information request from an automated form production application of a computing device associated with a third-party entity;
  wherein the electronic information request comprises user-related secure data associated with at least one form;
  wherein the user-related secure data is associated with an account of a user;
  identifying, by the at least one processor, each security classification associated with the user-related secure data of each item of the user-related secure data;
  determining, by the at least one processor, each security tier of each security classification;
  determining, by the at least one processor, a request security tier associated with the electronic information request according to a most secure security tier based on a hierarchy of security tiers;
  wherein the hierarchy of security tiers comprises more secure authentication requirements for a greater level of security tier in the hierarchy of security tiers;
  determining, by the at least one processor, at least one authentication requirement associated with the request security tier according to authentication settings of the assigned security tier of each item of the user-related secure data;
  wherein the at least one authentication requirement comprises a set of user authentication methods based on the request security tier;
  restricting, by the at least one processor, access to the user-related secure data associated with each item of the user-related secure data by the automated form production application until a user verification input verifying the user-related secure data associated with each item of the user-related secure data;
  generating, by the at least one processor, an authentication request enabling the user to provide user authentication response to the at least one authentication requirement to approve the computing device associated with the third-party entity for access to the user-related secure data;
  receiving, by the at least one processor, the user authentication response from the user in response to the at least one authentication requirement;
  wherein the user authentication response comprises the user verification input;
  authenticating, by the at least one processor, the user based on the user authentication response; and
  allowing, by the at least one processor, the computing device associated with the third-party entity to access the user-related secure data associated the electronic information request in response to the authentication of the user; and
  wherein the automated form production application is configured to parse the user-related secure data according to fields of the at least one form to auto-populate the fields with the user-related secure data; and
  wherein the automated form production application auto-populates each field of the electronic form with associated items of the user-related secure data.

2. The method of claim 1, further comprising determining, by the at least one processor, the assigned security tier of each item of the user-related secure data based on an information type of each item of the user-related secure data.

3. The method of claim 1, wherein the user-related secure data associated each item of the user-related secure data comprises at least one JSON file stored in a user account.

4. The method of claim 1, wherein assigned security tier of each item of the user-related secure data are user-defined.

5. The method of claim 1, wherein assigned security tier of each item of the user-related secure data are predetermined based on types of information.

6. The method of claim 1, further comprising:
  determining, by the at least one processor, a type of information of each item of the requested information; and
  determining, by the at least one processor, the assigned security tier of each item of the requested information based at least in part on the type of information of each item of the requested information.

7. A system comprising:
  at least one processor configured to implement instructions stored in a non-transitory computer readable medium causing the at least one processor to perform steps to:
  receive an electronic information request from an automated form production application of a computing device associated with a third-party entity;

wherein the electronic information request comprises user-related secure data associated with at least one form;

wherein the user-related secure data is associated with an account of a user;

identify each security classification associated with the user-related secure data of each item of the user-related secure data;

determine each security tier of each security classification;

determine a request security tier associated with the electronic information request according to a most secure security tier based on a hierarchy of security tiers;

wherein the hierarchy of security tiers comprises more secure authentication requirements for a greater level of security tier in the hierarchy of security tiers;

determine at least one authentication requirement associated with the request security tier according to authentication settings of the assigned security tier of each item of the user-related secure data;

wherein the at least one authentication requirement comprises a set of user authentication methods based on the request security tier;

restrict access to the user-related secure data associated with each item of the user-related secure data by the automated form production application until a user verification input verifying the user-related secure data associated with each item of the user-related secure data;

generate an authentication request enabling the user to provide user authentication response to the at least one authentication requirement to approve the computing device associated with the third-party entity for access to the user-related secure data;

receive the user authentication response from the user in response to the at least one authentication requirement;

wherein the user authentication response comprises the user verification input;

authenticate the user based on the user authentication response; and allow the computing device associated with the third-party entity to access the user-related secure data associated the electronic information request in response to the authentication of the user; and wherein the automated form production application is configured to parse the user-related secure data according to fields of the at least one form to auto-populate the fields with the user-related secure data; and wherein the automated form production application auto-populates each field of the electronic form with associated items of the user-related secure data.

8. The system of claim 7, wherein the at least one processor is configured to implement instructions causing the at least one processor to perform steps to determining, by the at least one processor, the assigned security tier of each item of the user-related secure data based on an information type of each item of the user-related secure data.

9. The system of claim 7, wherein the user-related secure data associated each item of the user-related secure data comprises at least one JSON file stored in a user account.

10. The system of claim 7, wherein assigned security tier of each item of the user-related secure data are user-defined.

11. The system of claim 7, wherein assigned security tier of each item of the user-related secure data are predetermined based on types of information.

12. The system of claim 7, wherein the at least one processor is configured to implement instructions causing the at least one processor to perform steps to:

determine a type of information of each item of the requested information; and determine the assigned security tier of each item of the requested information based at least in part on the type of information of each item of the requested information.

* * * * *